United States Patent [19]
Tokunaga et al.

[11] Patent Number: 5,151,583
[45] Date of Patent: Sep. 29, 1992

[54] FOCUS ADJUSTMENT DEVICE HAVING RESTRICTING MEANS FOR RESTRICTING A SELECTING ACTION ACCORDING TO THE DEGREE OF NEARNESS OF A DISTANCE MEASUREMENT

[75] Inventors: Tatsuyuki Tokunaga; Keisuke Aoyama; Hidehiko Fukahori; Yasuo Suda; Akira Akashi, all of Kanagawa, Japan

[73] Assignee: Canon Kabushiki Kaisha, Tokyo, Japan

[21] Appl. No.: 799,029

[22] Filed: Nov. 25, 1991

Related U.S. Application Data

[63] Continuation of Ser. No. 563,787, Aug. 6, 1990, abandoned, which is a continuation of Ser. No. 453,048, Dec. 21, 1989, abandoned, which is a continuation of Ser. No. 350,853, May 12, 1989, abandoned.

[30] Foreign Application Priority Data

May 16, 1988 [JP] Japan .................. 63-118817
May 16, 1988 [JP] Japan .................. 63-118818

[51] Int. Cl.$^5$ ............................... G01J 1/20
[52] U.S. Cl. .................. 250/201.2; 354/406
[58] Field of Search ..... 250/201 R, 201 DF, 201 AF, 250/204, 548, 214 R, 209, 201.2, 201.4, 201.5; 354/406, 402, 403

[56] References Cited

U.S. PATENT DOCUMENTS

| | | | |
|---|---|---|---|
| 4,080,531 | 3/1978 | Stauffer | 250/204 |
| 4,257,705 | 3/1981 | Hosoe et al. | 354/403 |
| 4,687,915 | 8/1987 | Sakai et al. | 250/201 |
| 4,688,919 | 8/1987 | Ogawa et al. | |
| 4,843,227 | 6/1989 | Matsui et al. | 250/201 |
| 4,943,824 | 7/1990 | Nabeshima et al. | |

Primary Examiner—David C. Nelms
Attorney, Agent, or Firm—Fitzpatrick, Cella, Harper & Scinto

[57] ABSTRACT

A focus adjustment device arranged to measure distances at a plurality of points on a picture plane specified by an optical means to be focus-adjusted and to adjust focus of the optical means on the basis of the results of distance measurement includes: selecting circuitry for selecting information on the nearest of measured distances obtained at the plurality of points, and restricting circuitry for restricting a selecting action of the selecting circuitry according to the nearness degree of the nearest distance in relation to the focal length of the optical means, the position of the distance measuring point on the picture plane, etc.

99 Claims, 16 Drawing Sheets

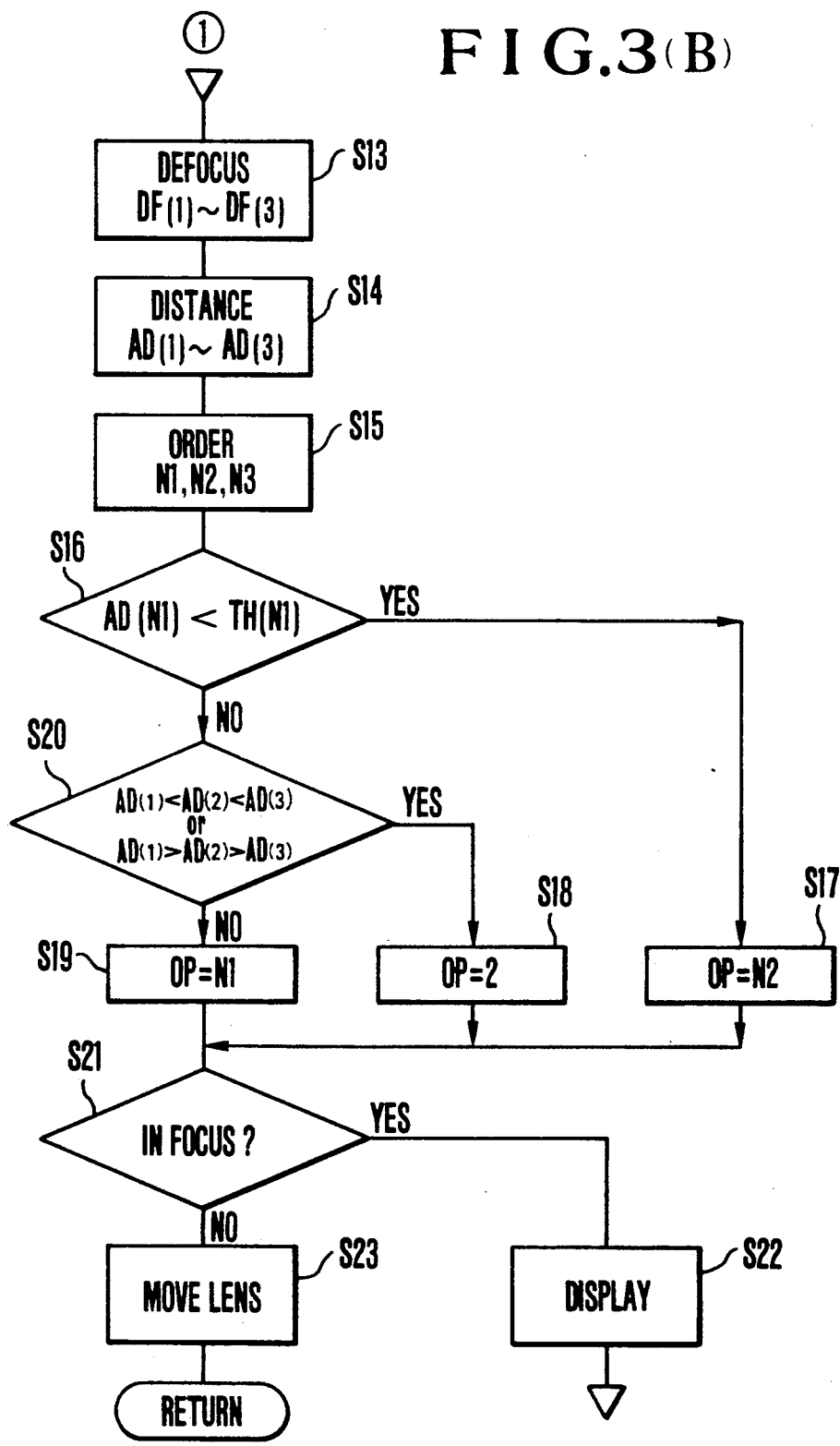

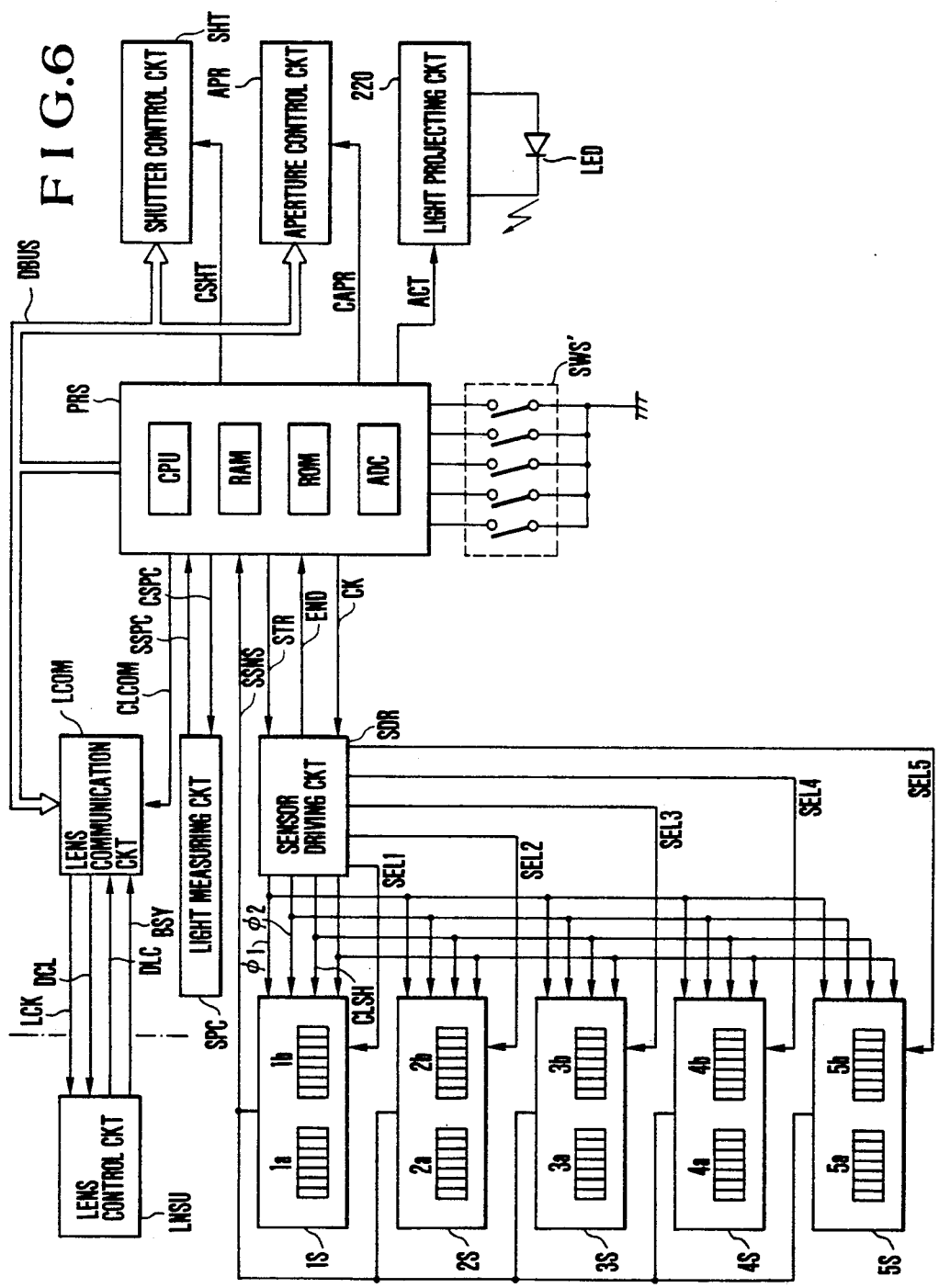

FOCUS ADJUSTMENT DEVICE HAVING RESTRICTING MEANS FOR RESTRICTING A SELECTING ACTION ACCORDING TO THE DEGREE OF NEARNESS OF A DISTANCE MEASUREMENT

This application is a continuation of application Ser. No. 07/563,787 filed Aug. 6, 1990, which is a continuation of Ser. No. 07/453,048, filed Dec. 21, 1989, which is a continuation of Ser. No. 07/350,853, filed May 12, 1989, all now abandoned.

BACKGROUND OF THE INVENTION

1. Field of the Invention

This invention relates to a focus adjustment device which is capable of detecting a focusing state of an optical system by considering plural parts of a picture plane.

2. Description of the Related Art

It is known that one type of focus detection device for cameras is arranged to divide the exit pupil of a photo-taking lens and to discriminate focusing states by sighting displacements of relative positions of two images formed by light fluxes passing through the divided exit pupil areas. For a focus detection device of this type, a secondary image forming method has been disclosed, among others, in Japanese Laid-Open patent applications No. SHO 55-118019 and No. SHO 55-155331. In accordance with this method, aerial images formed on a predetermined focal plane (equivalent to a film surface) by two secondary image forming optical systems arranged in parallel are guided to two sensor surfaces and any displacement in the relative positions of the two images is detected.

FIG. 14 of the accompanying drawings shows in outline the secondary image forming type focus detection device. A field lens 43 is arranged to have an optical axis 42 in common with the photo-taking lens 41 the focus of which is to be detected. Two secondary image forming lenses 44a and 44b are disposed behind the field lens 43 and symmetrically with respect to the optical axis 42. Photo-electric conversion element arrays 45a and 45b are disposed behind the lenses 44a and 44b, respectively. The field lens 43 forms images of the exit pupil of the photo-taking lens 41 approximately on the pupil planes of the secondary image forming lenses 44a and 44b. When the aerial image formed near to the field lens 43 is imaged again by the secondary image forming lenses 44a and 44b on the surfaces of the photo-electric conversion element arrays 45a and 45b, the positions of the two images formed on the photo-electric conversion element arrays 45a and 45b are varied according to the displacement of the position of the aerial image in the direction of the optical axis. FIGS. 15(A), 15(B) and 15(C) show this condition. Of these figures, FIG. 15(A) shows an in-focus state. In this instance, each of the two images is located in the middle part of each of the photo-electric conversion element arrays 45a and 45b. FIG. 15(B) shows a far-focus state. In that instance, each of the two images moves in the direction from the optical axis 42. FIG. 15(C) shows a near-focus state, in which each of the two images moves in the direction of approaching the optical axis 42. The luminous intensity distribution of the two images is photo-electrically converted. Then, the discrepancy in relative position between the two images is detected to find a focusing state of the photo-taking lens 41.

A method for processing photo-electric conversion signals output from the above-stated photoelectric conversion element arrays 45a and 45b has been disclosed in Japanese Laid-Open Patent Application No. SHO 58-142306, U.S. Pat. No. 4,333,007, etc.

Further, a focus detection device which is arranged to be capable of detecting focus not only at a central part of a distance measuring picture plane but also at some other part of the picture plane by using a plurality of focus detection devices of the above-stated kind has been disclosed in Japanese Patent Application No. SHO 62-279835.

FIG. 16 shows in an oblique view the optical system of the above-stated focus detection device. Referring to FIG. 16, light fluxes passing through the two exit pupils 71a of a photo-taking lens 71 are field-limited by a field mask 72. The field-limited light fluxes then pass through different split parts 73a to 73e of a field lens 73, and then are imaged on different line sensors 75a to 75e of a single line sensor 75 by different parts 74a to 74e of a secondary optical system 74. Image data obtained through photo electric conversion by the line sensor 75 is subjected to a computing operation which is performed in a known manner to detect focus.

FIG. 17 shows, as another example, the optical system of a focal detection device which is also arranged to perform focus detection at a plurality of points. Referring to FIG. 17, light fluxes passing through the two exit pupils 80a of a photo-taking lens 80 are field-limited by a field mask 81. The field-limited light fluxes are allowed to pass through different parts of one and the same field lens 82. After that, the light fluxes are imaged on different sensor arrays SAA1, SAB1, ..., SAA3 and SAB3 by image re-forming lenses 83 and 84. These images are photo-electrically converted and then computed in a known manner to detect focusing states obtained at a plurality of distance measuring points corresponding to the respective sensors.

When detecting focus at a plurality of distance measuring points, it is important to automatically select and determine a distance measurement result obtained at one of the distance measuring points based on which result the focus should be adjusted. To meet this requirement, one method for selecting an optimum distance measuring point has been proposed. According to the method proposed, focus adjustment is made on the basis of the output of a sensor in which a distance measurement result indicates the nearest distance. In some cases, however, the photographer wishes to take a picture of an object which is not located at the nearest distance. The above method, therefore, has presented a problem that it sometimes fails to perform focus adjustment as desired as it always selects the nearest distance.

SUMMARY OF THE INVENTION

In view of the above, it is the principal object of this invention to provide a focus adjustment device which is capable of solving the above-stated problem of the prior art by adequately carrying out focus adjustment. To attain this object, according to this invention, the focus adjustment device which measures distances at a plurality of points of a picture plane specified by an optical means to obtain distance measurement results and adjusts focus of the optical means on the basis of the distance measurement result comprises: selecting means for selecting information on a distance measurement result indicative of the nearest of the distance measurement results obtained at the plurality of points; and restricting means for restricting a selecting action of the selecting means according to a degree of nearness of the distance measurement result indicative of the nearest in consideration of a focal length of the optical means or the like, or a position of one of the plurality of points on the picture plane at which the distance measurement result indicative of the nearest is obtained, or the like.

The above and other objects and features of the invention will become apparent from the following detailed description of embodiments thereof taken in connection with the accompanying drawings.

BRIEF DESCRIPTION OF THE DRAWINGS

FIGS. 3(A) and 3(B) are flow charts showing the operation of the camera of FIG. 1.

FIGS. 6 is a block diagram showing the circuit arrangement of a camera to which the invention is applied as another embodiment thereof.

DETAILED DESCRIPTION OF THE PREFERRED EMBODIMENTS

Figure 1:
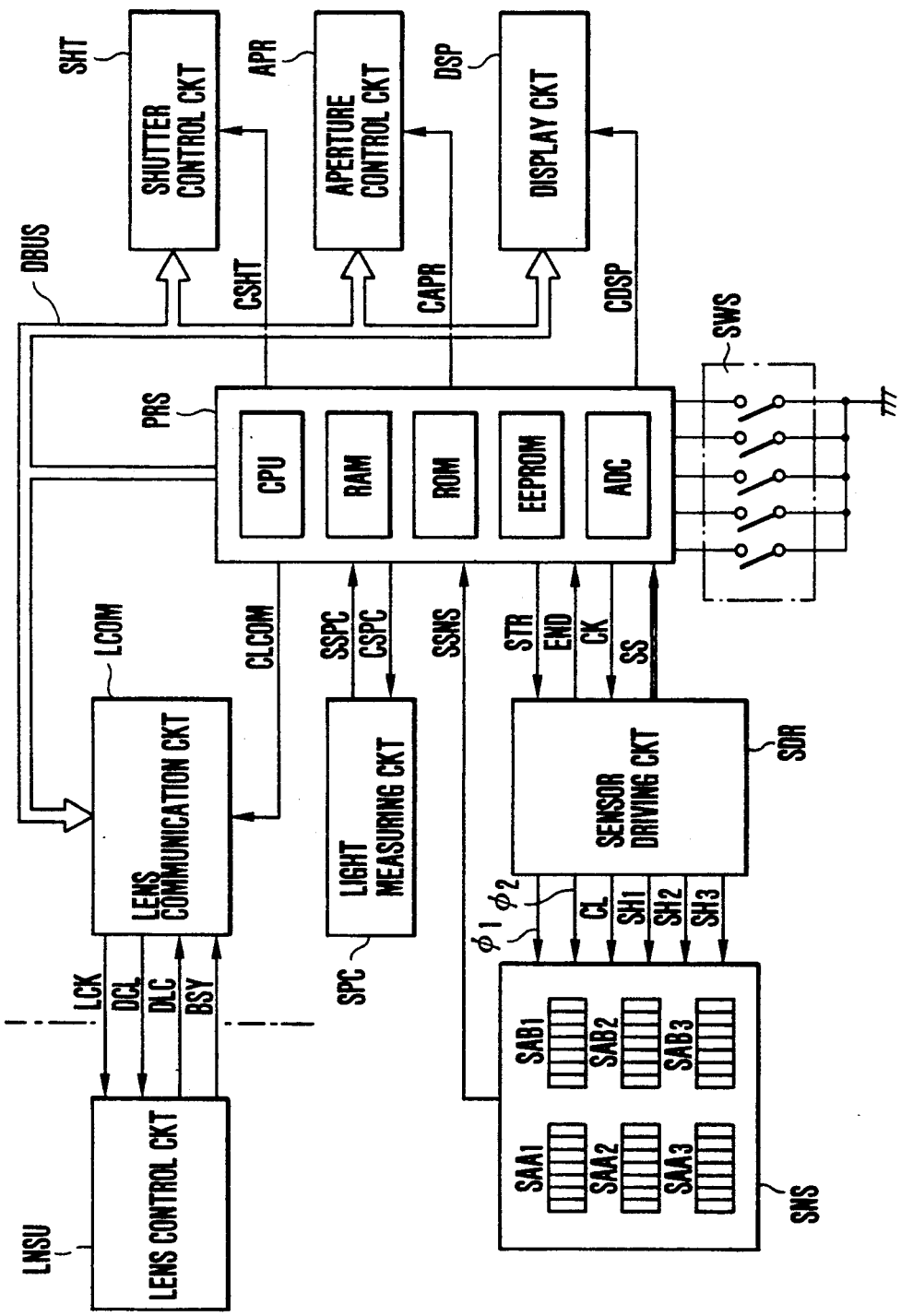
FIG. 1 is a block diagram showing the circuit arrangement of a camera to which the invention is applied.

The following describes in detail a multi-point distance measuring device embodying this invention with reference to the accompanying drawings:

FIG. 1 is a block diagram showing by way of example a focus adjustment device of a camera to which this invention is applied. The camera is provided with a control circuit PRS. The control circuit PRS is a one-chip microcomputer which includes a CPU (central processing unit), a RAM, a ROM, an EEPROM (an electrically erasable programmable ROM), an analog-to-digital converter (ADC), input and output ports, etc. The ROM and the EEPROM store camera controlling software including correction data of varied kinds and parameters. A reference symbol DBUS denotes a data bus and a symbol SHT a shutter control circuit. The shutter control circuit SHT is arranged to receive data which is supplied via the data bus DBUS while a control signal CSHT is being supplied from the control circuit PRS and to control the travels of leading and trailing shutter curtains (not shown) on the basis of the data received. An aperture control circuit APR is arranged to receive data via the data bus DBUS while a control signal CAPR is being supplied and to control a diaphragm mechanism (not shown) on the basis of the data received. A display circuit DSP is arranged to receive data via the data bus DBUS while a control signal CDSP is being supplied, and to display photographing information of varied kinds on the basis of the data received. A switch group SWS includes a release switch, a continuous shooting mode switch and switches for setting information of varied kinds.

A lens communication circuit LCOM is arranged to receive data via the data bus DBUS while a control signal CLCOM is being supplied and to have serial communication with a lens control circuit LNSU on the basis of the data received. The lens communication circuit LCOM supplies lens driving data DCL to the lens control circuit LNSU in synchronism with a clock signal LCK and, at the same time, serially receives lens information DLC. A signal BSY is generated by the lens control circuit LNSU to inform the camera body that a focusing lens (not shown) is being shifted. The above-stated serial communication is inhibited during the process of generation of the signal BSY.

A light measuring circuit SPC is arranged to send a measured light value output SSPC to the control circuit PRS upon receipt of a control signal CSPC from the control circuit PRS. The measured light value output SSPC is A/D converted into a digital signal by the A/D converter (ADC) disposed within the control circuit PRS. The digital signal thus obtained is used as data for controlling the shutter control circuit SHT and the aperture control circuit APR.

A sensor driving circuit SDR is arranged to control, in accordance with the above-stated signals output from the control circuit PRS, a line sensor SNS which is, for example, a CCD or the like. The line sensor SNS consists of three pairs of sensor arrays SAA1, SAB1, ---, SAA3 and SAB3.

Figure 16:
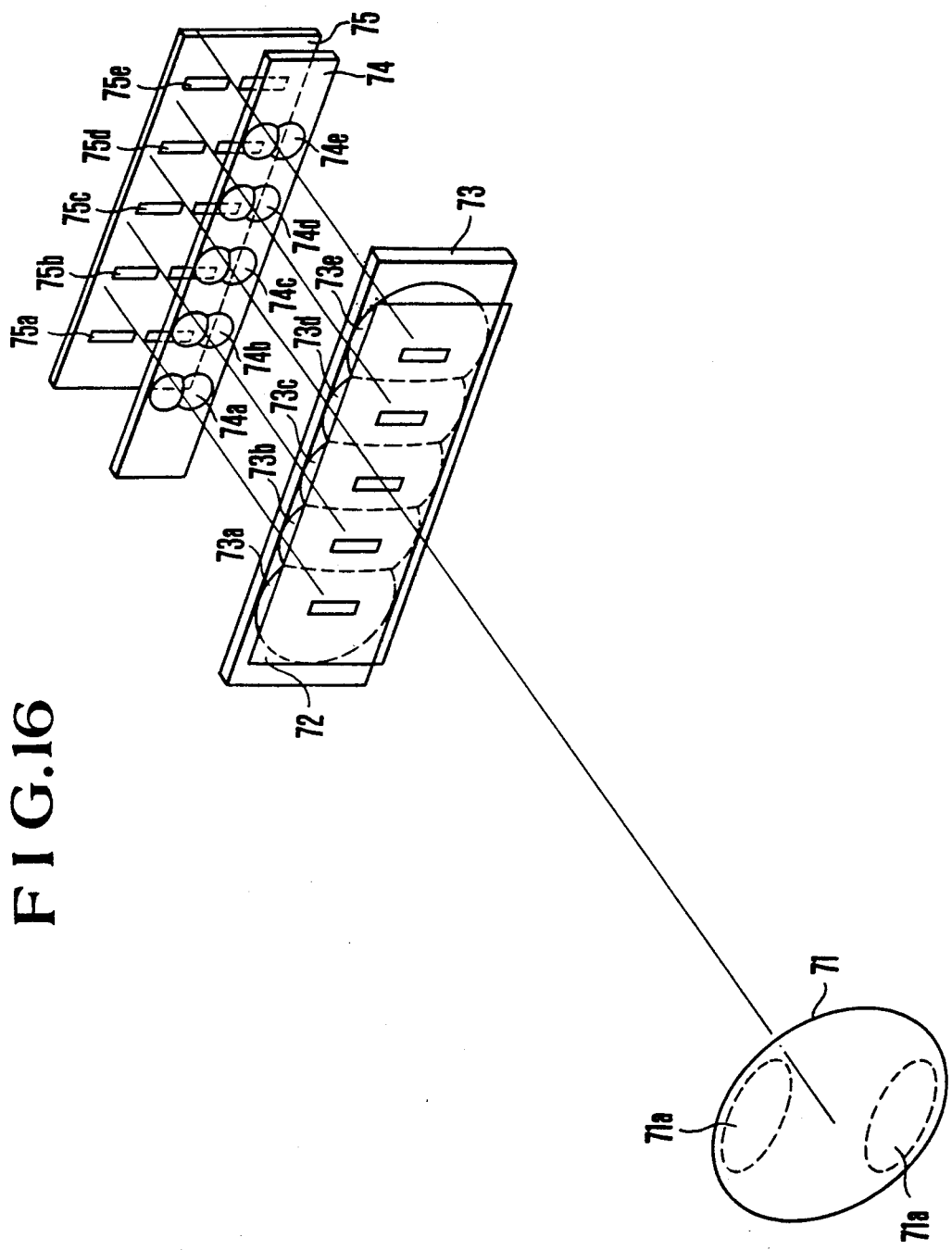
FIGS. 16 and 17 show optical systems arranged for multi-point focus detection.
Figure 17:
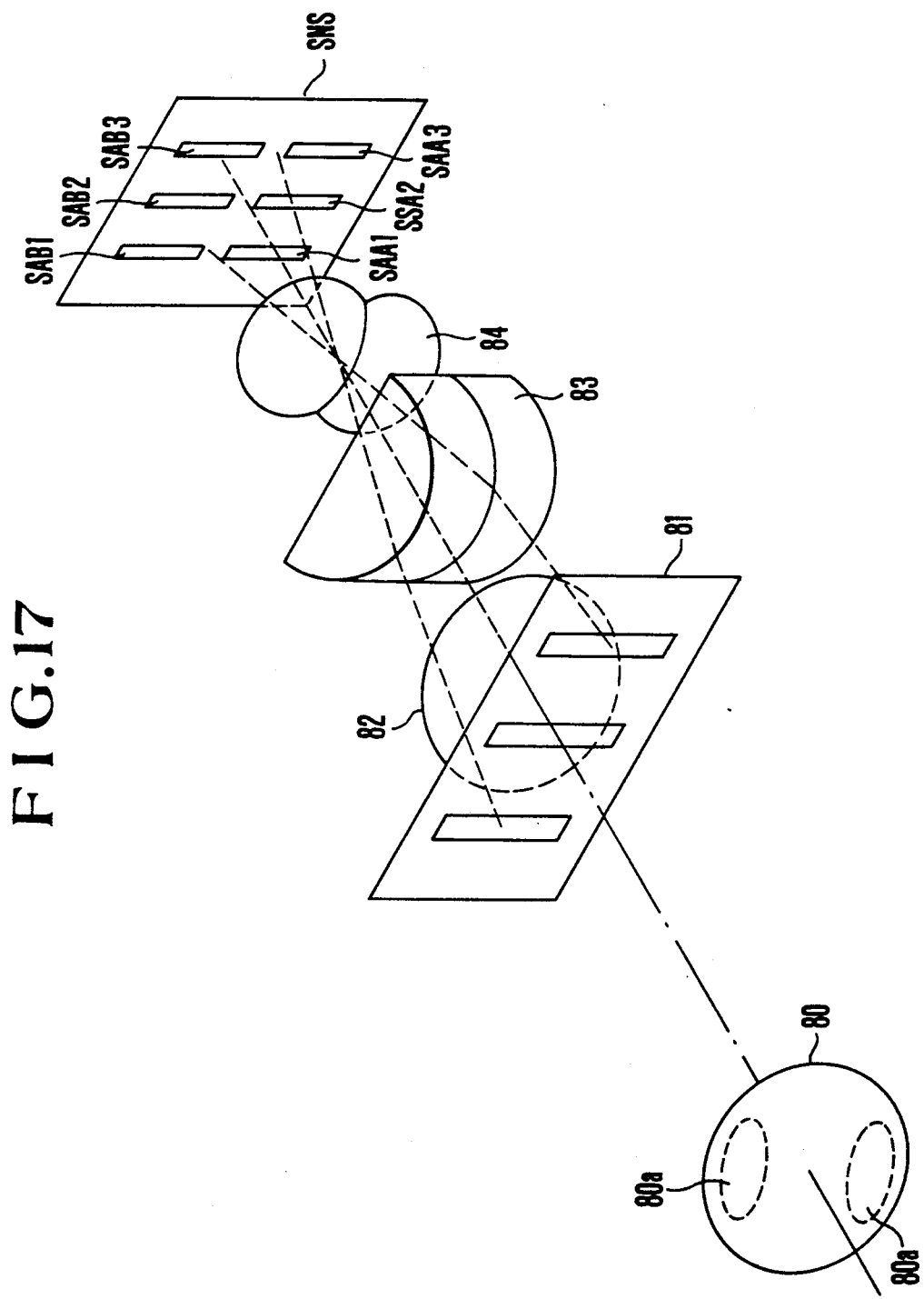

When the control circuit PRS sends a storage start signal STR to the sensor driving circuit SDR, the sensor driving circuit SDR produces a clear signal CL to the line sensor SNS. Then, all the photo-electric conversion parts of the sensor arrays SAA1, SAB1, ---, SAA3 and SAB3 are cleared of electric charges. Then the line sensor SNS begins to store electric charge while photo-electric converting light images are formed on the sensor arrays SAA1, SAB1, ---, SAA3 and SAB3 by a secondary image forming lens, which is not shown in FIG. 1 but is arranged as indicated by the part 74 of FIG. 16 or the parts 83 and 84 of FIG. 17. The storage time of the sensor SNS is controlled by the sensor driving circuit SDR. Upon completion of the storing action of the sensor SNS, the sensor driving circuit SDR sends transfer signals SH1 to SH3 to the line sensor SNS. In response to the transfer signals SH1 to SH3, the line sensor SNS transfers the electric charge stored at the photo-electric conversion part to the CCD part thereof. At the same time, the sensor driving circuit SDR supplies the control circuit PRS with a storage end signal END and an identification signal SS indicative of each sensor array which has completed the storage. After that, the sensor driving circuit SDR awaits the arrival of a CCD driving clock signal CK from the control circuit PRS. Upon arrival of the CCD driving clock signal CK, the sensor driving circuit SDR forms CCD driving signals $\phi 1$ and $\phi 2$ and supplies them to the line sensor SNS. Then, in accordance with these CCD driving signals $\phi 1$ and $\phi 2$, the line sensor SNS supplies an analog image signal SSNS to the control circuit PRS. The control circuit PRS then A/D-converts the analog image signal SSNS in synchronism with the CCD driving clock signal CK. Paired image signals are thus obtained and stored at predetermined addresses within the RAM.

Figure 2:
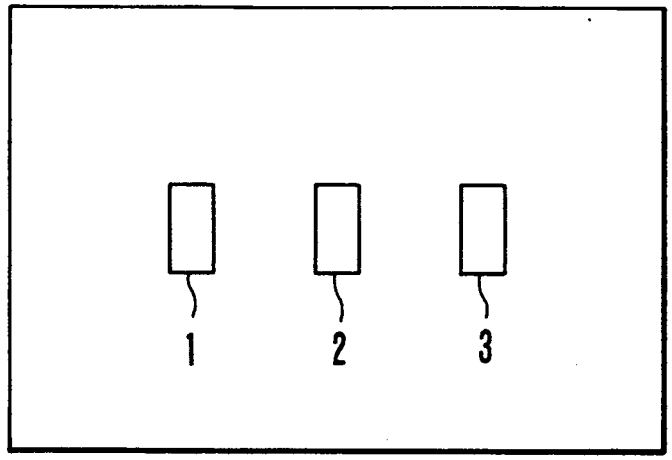
FIG. 2 shows the positions of distance measuring points obtained on the viewfinder of the camera of FIG. 1.

FIG. 2 shows the allocation of distance measuring areas 1, 2 and 3 serving as distance measuring points within a viewfinder. A light flux passing through the distance measuring area 1 of the picture plane is imaged on the sensor arrays SAA1 and SAB1 by the optical system of FIG. 17. Other distance measuring areas 2 and 3 are also arranged likewise to have images formed on the sensor arrays SAA2 and SAB2 and on the sensor arrays SAA3 and SAB3 respectively. Each of these images is used for detecting a focusing state in each distance measuring point.

Figure 3A:
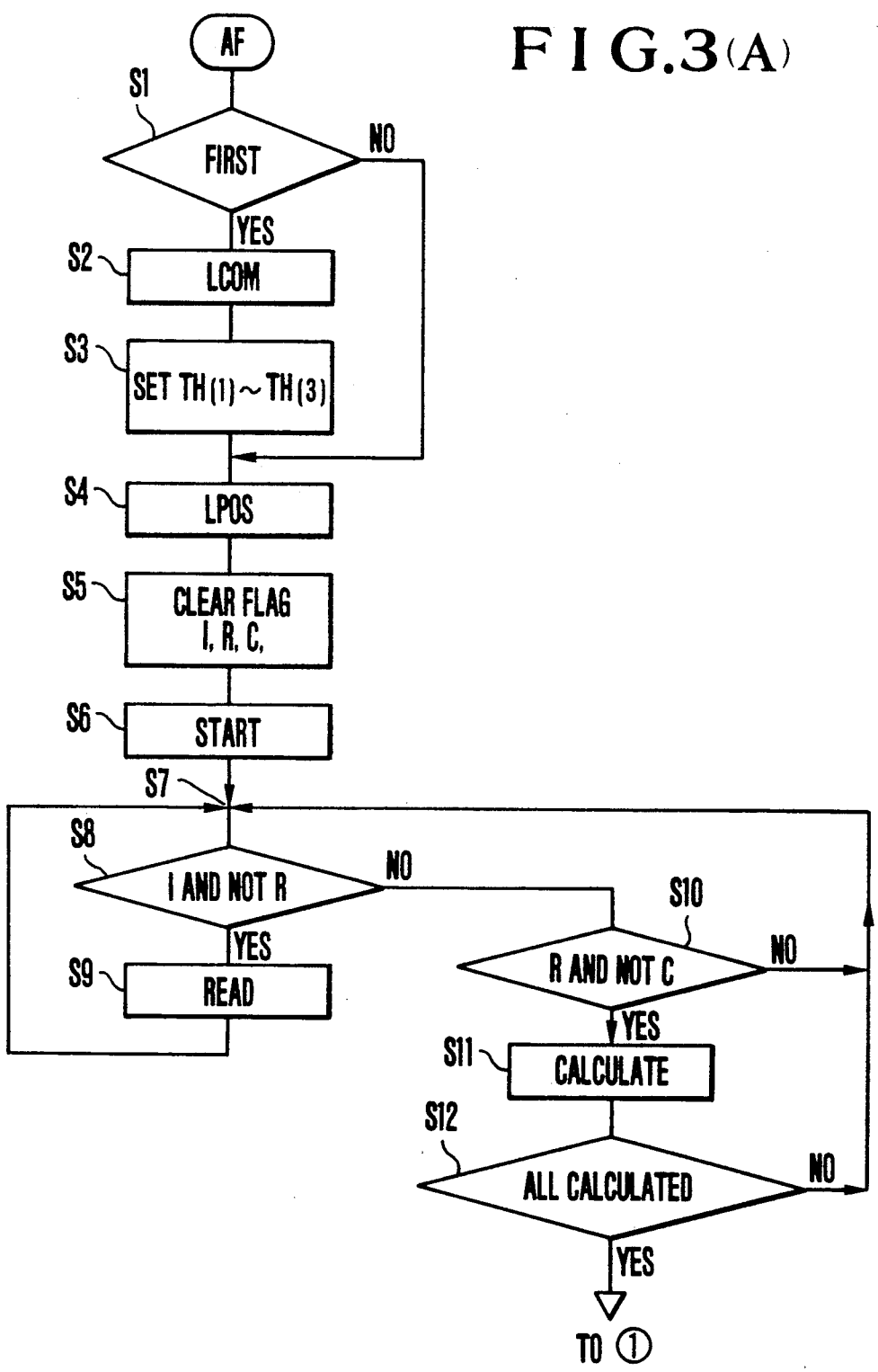

Referring to FIGS. 3(A) and 3(B) which are flow charts, the focus adjusting operation of the above-stated embodiment is as follows: The focus adjusting operation is a subroutine which is arranged to start control in response to a subroutine call from the main routine of the camera. The operation of any part of the arrangement that is shown in FIG. 1 but is not directly related to the focus adjusting operation is omitted from the following description. The CPU (central processing unit) of the control circuit PRS operates as shown in the flow chart of FIG. 3 in the following manner: Step S1: A check is made to see if a distance measuring computation is to be performed for the first time. If so, the flow proceeds to a step S2. If not, the flow branches to a step S4. Step S2: Information on the lens is obtained by communication with the lens control circuit LNSU and is supplied to the control circuit PRS. Thus information on the focal length of the lens, the closest distance, a sensitivity coefficient, a comb teeth pitch, etc. is read out from the lens control circuit LNSU. Step S3: Closest-distance threshold values TH(1), TH(2) and TH(3) are computed for the respective distance measuring areas on the basis of the information read in the step S2.

These threshold values are different depending on the distance measuring points. For example, by using the focal length f of the lens, the threshold values for the left and right distance measuring points are set at:

$$TH(1) = TH(3) = 20f$$

For the central distance measuring point, the threshold value is set at a value indicating a nearer distance than the left and right distance measuring points, as follows:

$$TH(2) = 10f$$

This is because the central part of the picture plane seldom has any undesired obstacle appear at a near distance. In the event of a condition indicating a close-up shot with a macro lens, this threshold value is multiplied by a given value of magnification (less than "1") to lower the threshold value. Step S4: The current absolute position of the lens is read out from the lens. In the event of an absence of information on the absolute position of the lens, the lens is once shifted to its infinity distance position at a suitable time such as when the power supply is switched on. The movement of the lens is stored in a memory. The current position of the lens is obtainable from this. Step S5: Flags which indicate the states of the distance measuring points are cleared for initial setting. These flags include, for the three distance measuring points 1, 2 and 3, storage end flags I1, I2 and I3, reading completion flags R1, R2 and R3, and computation end flags C1, C2 and C3. Step S6: A control signal is supplied to the distance measuring sensor SNS to cause it to start a storing action. Upon completion of the storing action by the sensor SNS, an interrupt instruction is received from the sensor driving circuit SDR, and an interrupt process is performed. In response to the interrupt, the storage end flag I corresponding to each sensor array which has completed the storing action is set to indicate the end of the storing action. Step S8: A check is made to see if there remains any distance measuring area for which the storage by the sensor has been completed but has not been read. If so, the flow proceeds to a step S9. If not, the flow branches to a step S10. Step S9: The outputs of the sensor SNS are read. A reading clock signal is supplied to the sensor SNS. The A/D converter ADC performs A/D conversion on the outputs one after another. The data thus obtained is read. The A/D-converted data is subjected to a compensatory computing operation. The data is then stored in the RAM. A reading end flag R is set for each distance measuring point for which data reading has been completed. The flow then comes back to the step S7.

Step S10: A check is made to see if there still remains any distance measuring area for which a correlation computing operation has not been performed after the end of the data reading. If any of the data still remains to be subjected to the correlation computing operation after the end of reading, the flow branches to a step S11. If not, the flow comes back to the step S7. Step S11: A correlation computing operation is performed to find any prediction value of an image discrepancy degree obtained on the sensor SNS. The image discrepancy degree is computed in a known manner. The result of the computing operation is stored in the applicable part of the RAM. Upon completion of the correlation computing operation, the computation end flag is set for each applicable distance measuring area (or point). Step S12: A check is made for completion of the computing operation for every distance measuring point. If all the computation end flags are found to have been set up indicating the end of the computing operation for all the three distance measuring points, the flow branches to a routine ① which is shown in FIG. 3(B). If not, the flow comes back to the step S7.

Step S13: The degree of defocus of the lens is obtained from the prediction value obtained at the step S11. The relation between the prediction value and the defocus degree is determined by the secondary optical system for focus detection and the optical parameters of the photo-taking lens. Defocus degrees relative to the distance measuring points 1, 2 and 3 are expressed as DF(1), DF(2) and DF(3) respectively. Step S14: Absolute distances AD(1), AD(2) and AD(3) detected at the distance measuring points are obtained from the defocus degrees DF(1), DF(2) and DF(3) obtained at the step S13 and the lens position information stored at the step S4. Step S15: The absolute distances AD(1) to AD(3) are compared with each other and are numbered in the order of nearer distances. Variables N1 to N3 are set to the numbers of the distance measuring points so that the variable N1 is set to a number of the distance measuring point indicative of the nearest of the absolute distances AD(1) to AD(3), the variable N2 to a number of the distance measuring point indicative of the second nearest, and the variable N3 to a number of the distance measuring point indicative of the farthest. Step S16: The nearest of the measured distances is compared with the applicable threshold value. Since the number of the nearest distance measuring point (N1) has already been obtained at the step S15, the measured distance AD(N1) is compared with the threshold value TH(N1). If the measured distance AD(N1) is nearer than the threshold value TH(N1), the flow branches to a step S17. If it is farther than the threshold value, the flow branches to a step S20. For example, when the distance measured at the distance measuring area 3 is nearest, the variable N1 is set to "3", so that the measured distance AD(3) is compared with the threshold value TH(3) for the distance measuring area 3. Step S20: A check is made to see if the measured distance values indicate consecutively increasing distances. In other words, in a case where the distance measured at the distance measuring area 1 is nearest and the other distances are consecutively further, the relation AD(1)<AD(2)<AD(3) is obtained. In the reverse case, the relation AD(3)<AD(2)<AD(1) is obtained. Therefore, these relations are judged. If one of the above relations is obtained, the flow branches to a step S18. If not, the flow branches to a step S19. Step S17: Since the nearest distance point value is smaller than the threshold value, the second nearest point is selected and a number of the second nearest point (N2) is stored in a variable OP. Step S18: In the case of consecutively aligned objects, the central distance measuring point (distance measuring point number "2") is selected. The selected distance point number "2" is stored in the variable OP. Step S19: In a case where the flow does not branch due to the decision made at the steps S16 and S20, the nearest distance point (N1) is stored in the variable OP. Step S21: Upon completion of selection of the distance measuring point, a check is made to see if the selected distance measuring point is in focus. If so, the flow branches to a step S22. If not, the flow branches to a step S23. Step S22: A display is made indicating the in-focus state. Then, the flow branches to a sequence of operation processes which are not shown. Step S23: The lens is driven. The extent to which the lens is driven is computed and the lens driving control is performed through communication with the lens. After a driving signal is sent out to the lens, the flow returns to the main routine of the camera which is not shown.

After completion of predetermined control processes in the main routine of the camera, the focus adjusting routine is called again. The distance measuring point of the multi-point distance measuring device thus can be selected in the manner described above.

Figure 4A:
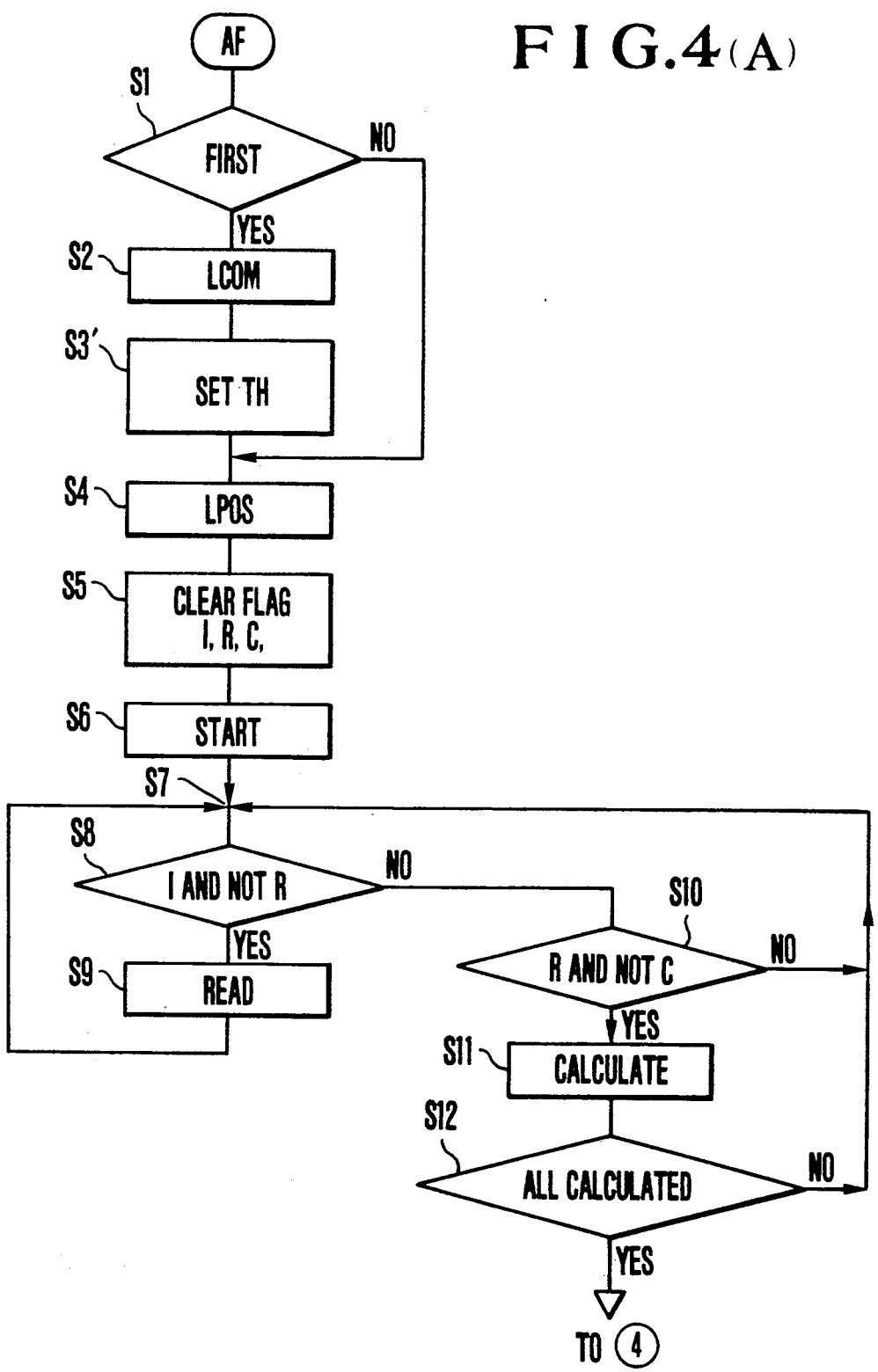
FIGS. 4(A) and 4(B) are flow charts showing also the operation of the camera of FIG. 1.
Figure 4B:
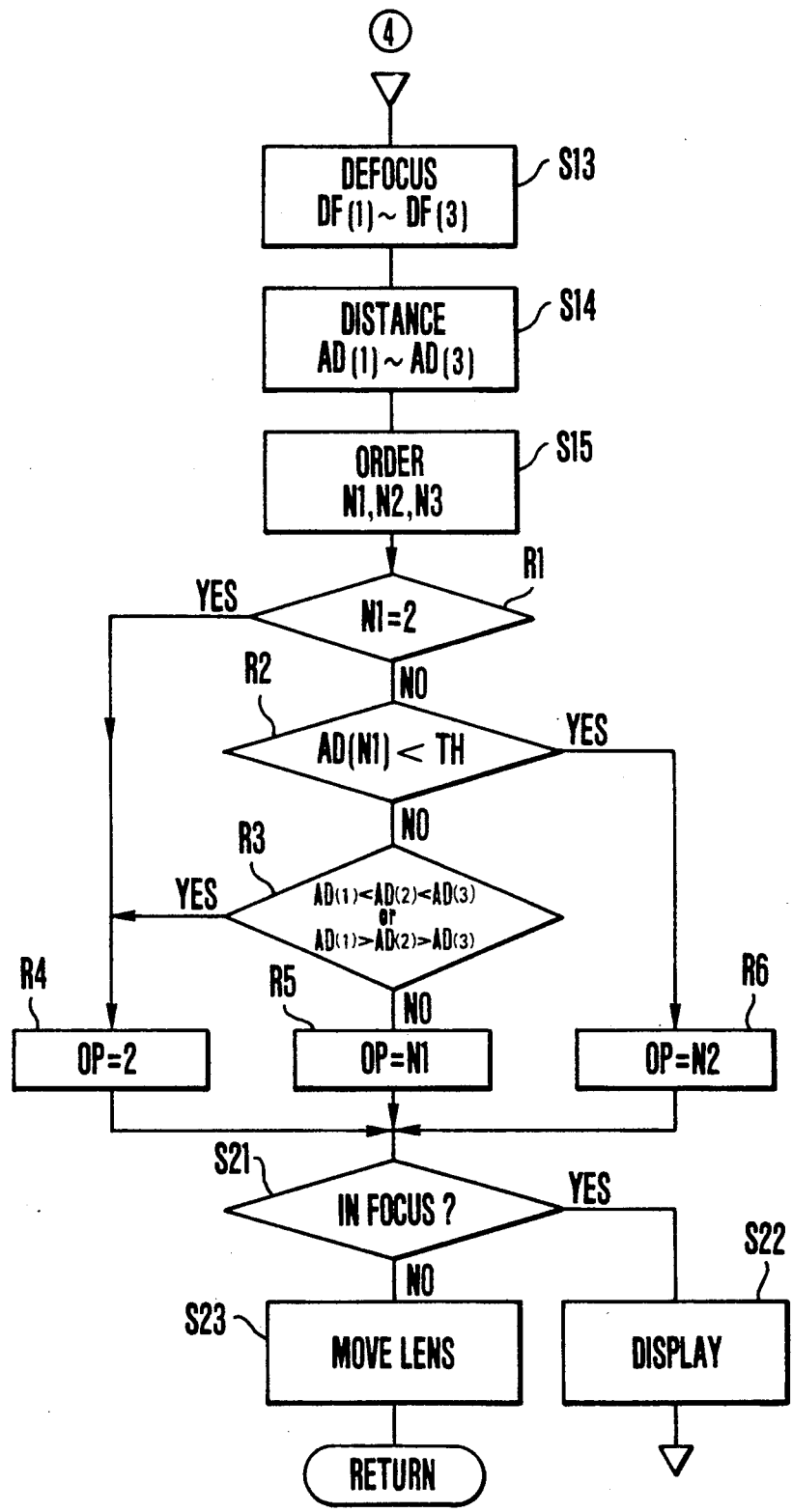

FIGS. 4(A) and 4(B) are flow charts showing the operation of another embodiment of the invention. The arrangement shown in FIGS. 4(A) and 4(B) differs from the arrangement shown in FIGS. 3(A) and 3(B) in the following points: In the case of FIGS. 4(A) and 4(B), the near distance point threshold value is not set for every distance measuring point but is set to be used in common for the different distance measuring points. Further, no threshold value is used in selecting the central distance measuring point. A part of the flow from step S1 to step S15 is the same as the flow of FIGS. 3(A) and 3(B) including a threshold value setting action with the exception that only one threshold value is set, at a step S3', in the case of FIGS. 4(A) and 4(B). More specifically, between the step S1 and the step S5, the state of each distance measuring point and the position of the photo-taking lens are stored and the initial setting action is performed. From the step S6 through the step S12, the storing action of the sensor SNS, the reading action, and the predictive computing operation are performed. At steps S13, S14 and S15, the order of defocus degrees and distances is obtained from the prediction values. The flow then proceeds to:

Step R1: A check is made to see if the nearest measured distance N1 is obtained from the central distance measuring point. If so, the flow branches to a step R4 without comparison with the threshold value. If not, the flow proceeds to a step R2. At the step R2: The nearest measured distance is compared with the threshold value. If the nearest measured distance is nearer than the threshold value, the flow branches to a step R6. If it is farther than the threshold value, the flow proceeds to a step R3. At the step R3: Like in the case of the step S20, a check is made to see if the measured distances are consecutively farther away from the camera. In other words, the check is made for a state in which the measured distance of the central distance measuring point 2 is farther than that of the left distance measuring point 1, and that of the right distance measuring point 3 is still farther than that of the central distance measuring point 2, or a state in which the measured distance of the right distance measuring point 3 is the nearest, that of the center point 2 is farther and that of the left point 1 is the farthest. If so, the flow branches to the step R4. If not, the flow branches to a step R5.

Step R4: The distance measuring point is determined to be the central distance measuring point 2. Step R5: The distance measuring point is determined to be the distance measuring point giving the nearest distance. Step R6: The distance measuring point is determined to be the distance measuring point giving the second nearest distance. At steps S21, S22 and S23: The focusing state of the distance measuring point is checked to see if it is in focus. If so, a display is made accordingly. If not, the lens is driven for focus adjustment in the same manner as in the case of FIGS. 3(A) and 3(B).

Figure 5A:
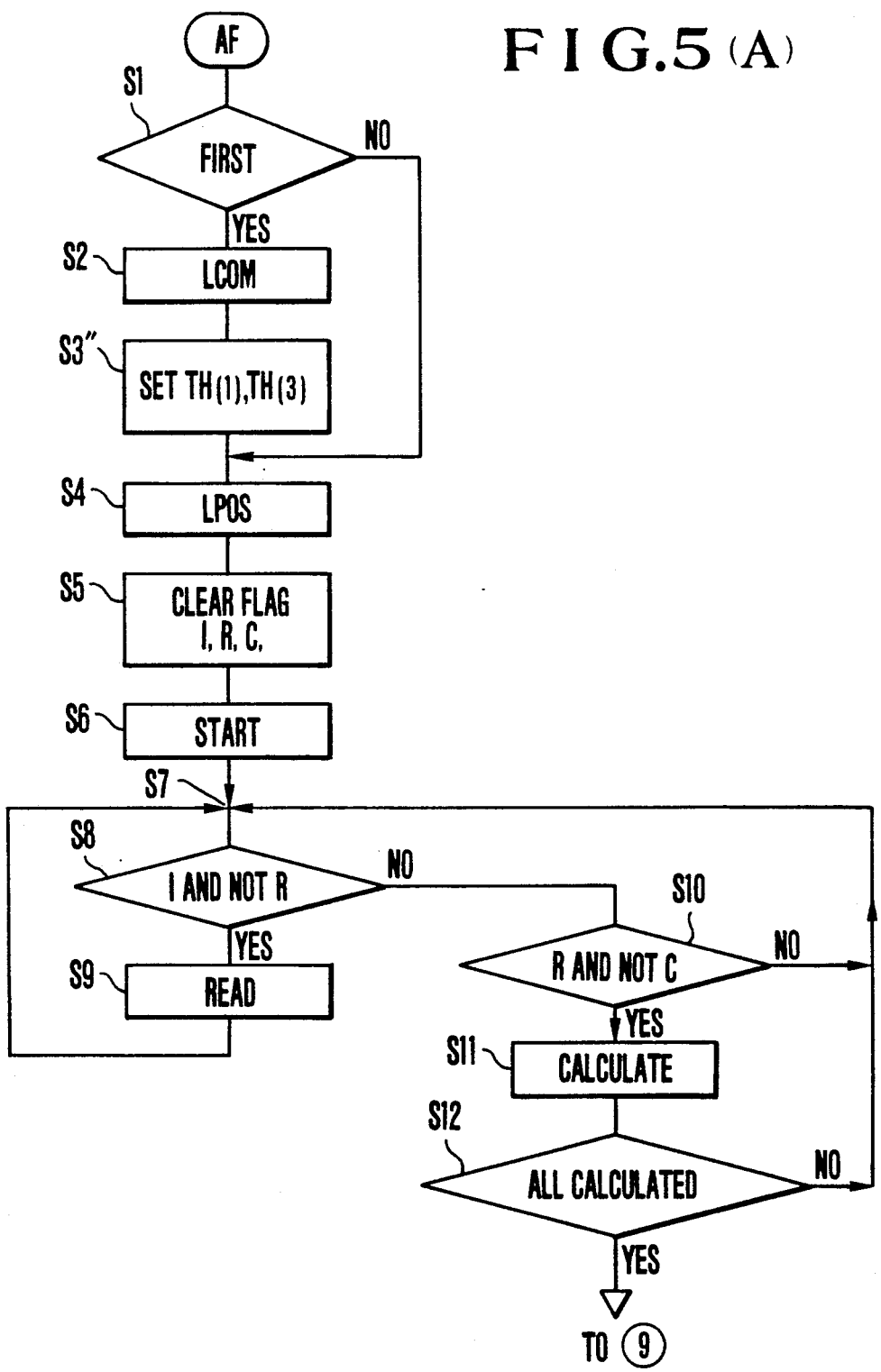
FIGS. 5(A) and 5(B) are flow charts further showing the operation of the camera of FIG. 1.
Figure 5B:
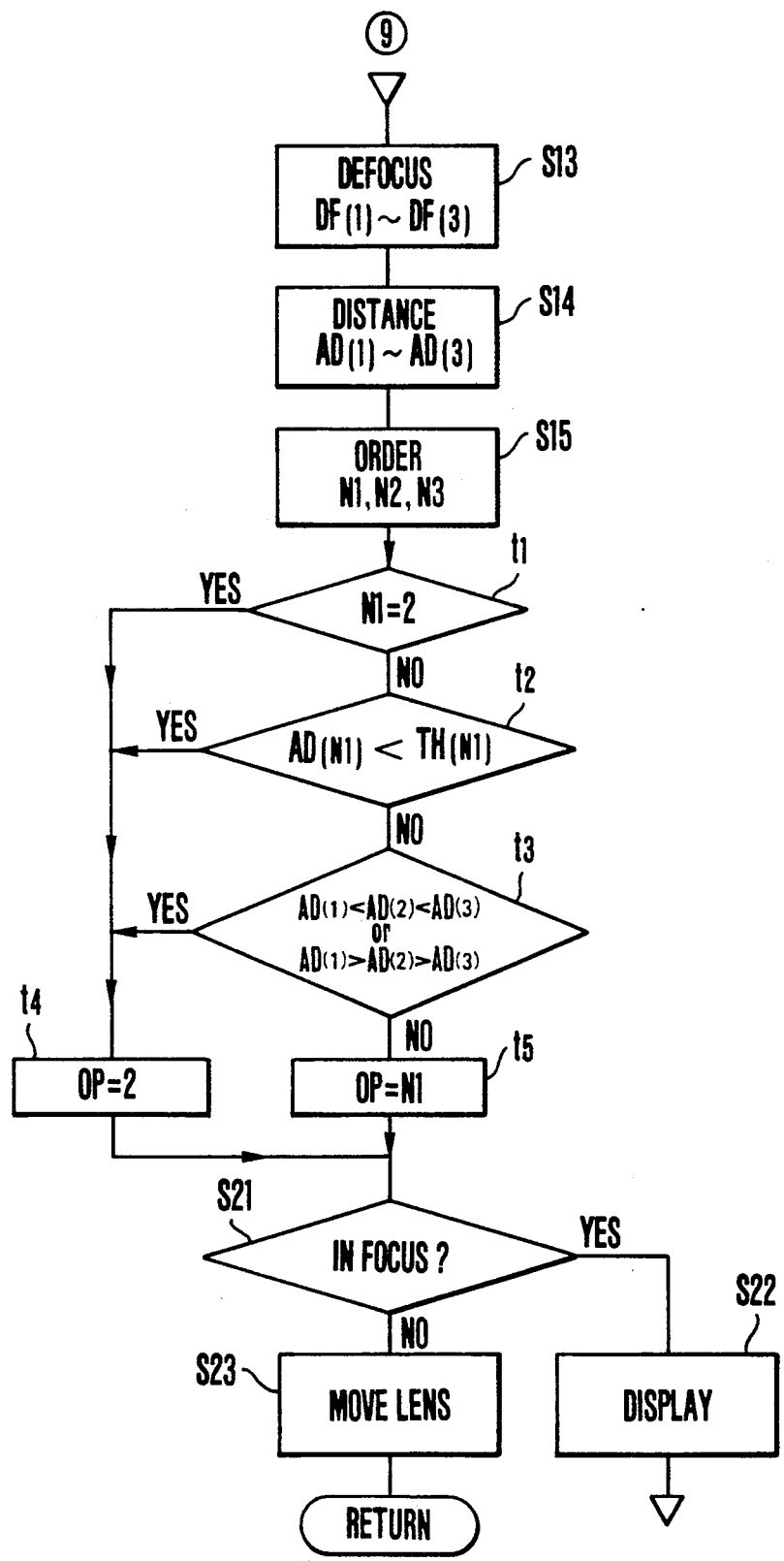

FIGS. 5(A) and 5(B) show a process flow of a further embodiment of the invention which differs from the operations shown in FIGS. 3(A), 3(B) and 4(A), 4(B) in the following point: The focus adjustment is made for the central distance measuring point in a case where the measured distance is found to be nearer than the near distance point threshold value. The flow is the same as in the case of FIGS. 3(A) and 3(B) with the exception that, from the step S1 through the step S15, the threshold values TH(1) and TH(3) are set without setting any threshold value for the central distance measuring point at a step S3". Briefly stated, the flow of operation is as follows: The states of the distance measuring points are checked and the position of the photo-taking lens is set at steps S1 to S4. The storing action is performed at the sensor SNS and data is read out to perform the predictive computing operation at steps S6 to S12. A check is made for the defocus degree of the lens; and measured distance values of the distance measuring points are computed and compared at steps S13 to S15. After the step S15, the flow comes to a step t1.

Step t1: The central distance measuring point would be selected to be the distance measuring point even if the nearest measured distance is found to be obtained at the central distance measuring point. The flow, therefore, branches to a step t4 if the nearest measured distance has been obtained at the central point. In a case where one near distance point threshold value is set to be used in common, the step t1 is not necessary. Step t2: The measured distance value is compared with the near distance point threshold value. If the nearest measured distance value is found to be nearer than the threshold value set for the distance measuring point at which the nearest distance is obtained, the flow branches to the step t4. Step t3: Like in the cases of the steps S20 and R3, a check is made for a state of having consecutively farther measured distances. In the event of such a state, the flow branches to the step t4. Step t4: The central distance measuring point is selected as the distance measuring point. Step t5: The measuring point at which the nearest measured distance is obtained is selected as the distance measuring point. Steps S21 to S23: The distance measuring point selected is checked for an in-focus state in the same manner as in the case of FIGS. 3(A) and 3(B). Control is performed according to an in-focus state or a defocus state of the photo-taking lens.

The following describes a further embodiment of the invention: FIG. 6 is a block diagram showing by way of example the focus adjustment device of a camera to which this invention is advantageously applied. In FIG. 6, the same component parts as those of FIG. 1 are indicated by the same reference symbols and the details of them are omitted from description.

Referring to FIG. 6, a reference symbol SWS' denotes a switch group including a release switch, a continuous shooting mode switch, switches for setting information of varied kinds, a selection switch provided for selection between a focus detection mode of considering only the central part of the picture plane and another focus detection mode of considering both the central part and the marginal part of the picture plane as will be described later, etc. A light projecting circuit 220 is arranged to project an auxiliary light for focus detection. The auxiliary light is emitted by driving an LED according to a control signal ACT output from a control circuit PRS and a synchronizing clock signal CK.

Figure 7:
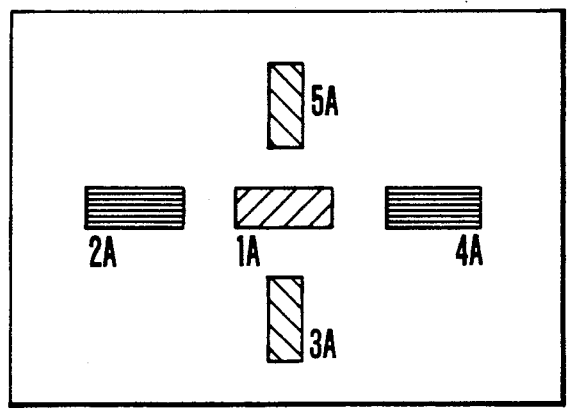
FIG. 7 shows the allocation of focus detecting fields on the picture plane of the camera of FIG. 6.

A group of distance measuring light receiving circuits 1S to 5S respectively consist of pairs of line sensors from 1a and 1b through 5a and 5b. Each of these circuits 1S to 5S is arranged to receive the light of an image obtained in a position on a picture plane corresponding to one of detection fields 1A to 5A which are arranged on the picture plane as shown in FIG. 7. A sensor driving circuit SDR is arranged to control these light receiving circuits 1S to 5S in accordance with signals STR and CK supplied from the control circuit PRS. The sensor driving circuit SDR produces control signals $\phi 1$, $\phi 2$, CL and SH for controlling the light receiving circuits 1S to 5S and selection signals SEL1 to SEL5 for selection of one of the light receiving circuits 1S to 5S. An image signal SSNS obtained from the light receiving circuit thus selected is supplied to the control circuit PRS.

Figure 8:
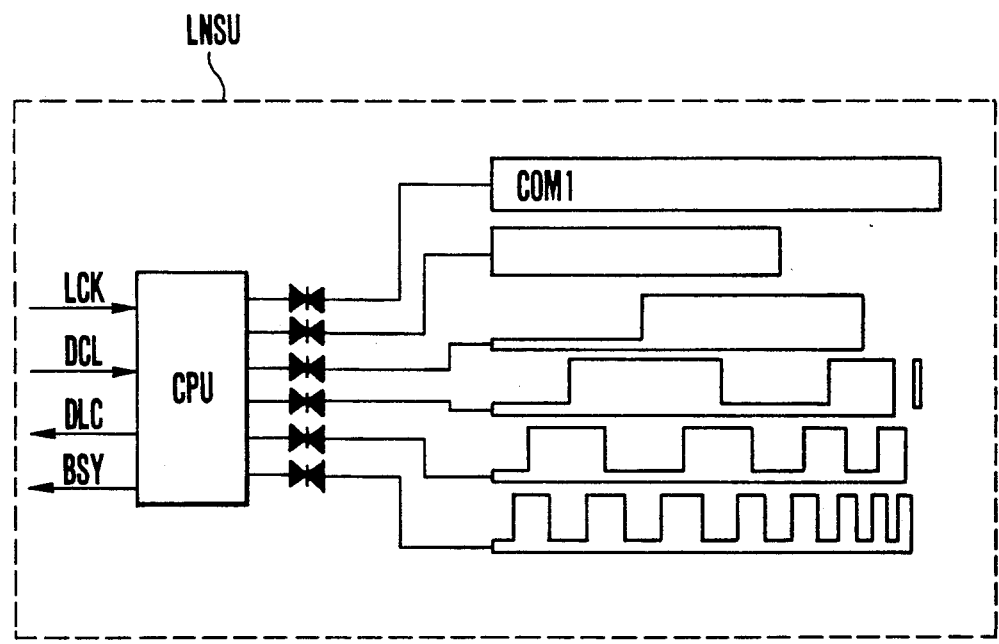
FIG. 8 shows an arrangement for detecting the positions of the distance ring and the zoom ring of the lens of the camera of FIG. 6.

FIG. 8 shows a manner in which the lens control circuit LNSU obtains information on the focal length of the lens and information on a distance ring. The position of the distance ring and that of a zoom ring are detected by brush means and are converted into signals of five bits. These signals are computed by a CPU included in the lens control circuit LNSU. As a result, a lens information signal DLC is supplied via the lens communication circuit LCOM to the control circuit PRS. In this case, the distance ring position information does not have to be accurate as it is not used directly for focus computation. The light receiving circuits 1S to 5S are arranged to receive the light of the photographing object through an optical system which is similar to the arrangements shown in FIGS. 16 and 17 which have been described in the foregoing.

Figure 9:
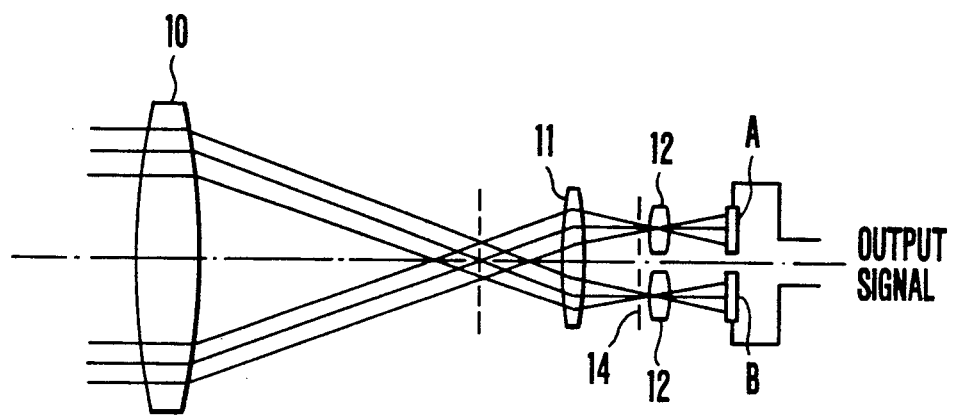
FIG. 9 shows the arrangement of the focus detecting optical system of the camera of FIG. 6.
Figure 10:
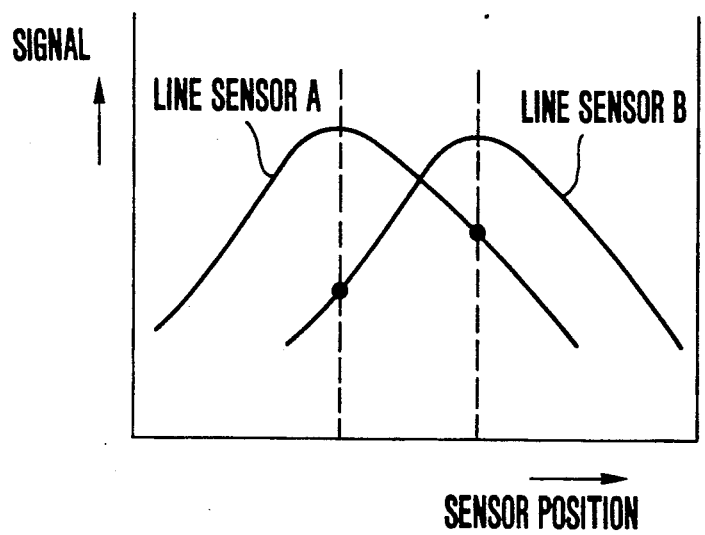
FIG. 10 is an illustration of the focus detecting principle of the camera of FIG. 6.

FIG. 9 shows the optical system to be used for focus detection. The illustration includes a photo-taking lens 10; a field lens 11; a secondary image forming lens 12; the pair of line sensors A and B of each of the above-stated light receiving circuits 1S to 5S; and an aperture mask 14.

Referring to FIG. 9, light from the object is primarily imaged through the photo-taking lens 10. After that, the light is again imaged by the field lens 11 and the secondary image forming lens 12 on the line sensors A and B. The signals of the two images formed on the line sensors A and B show a discrepancy in peak position between them in the case of defocus. The discrepancy in peak position between the two image signals disappears when an in-focus state is obtained. To detect the in-focus position of the lens, therefore, one of the two image signals is shifted by one bit at a time relative to the other image signal. A position where the integrated value of a larger value (or a smaller value) obtained at each point of the two images reaches a minimum (or maximum) value is obtained by a computing operation.

However, the signal showing the in-focus position obtained by computation might be incorrect due to some noise resulting from a low contrast state or a low brightness state of the object to be photographed. To avoid such an error, the degree of the contrast of the image is obtained at the same time and the focus is determined to be undetectable if the contrast is below a given value.

Figure 11:
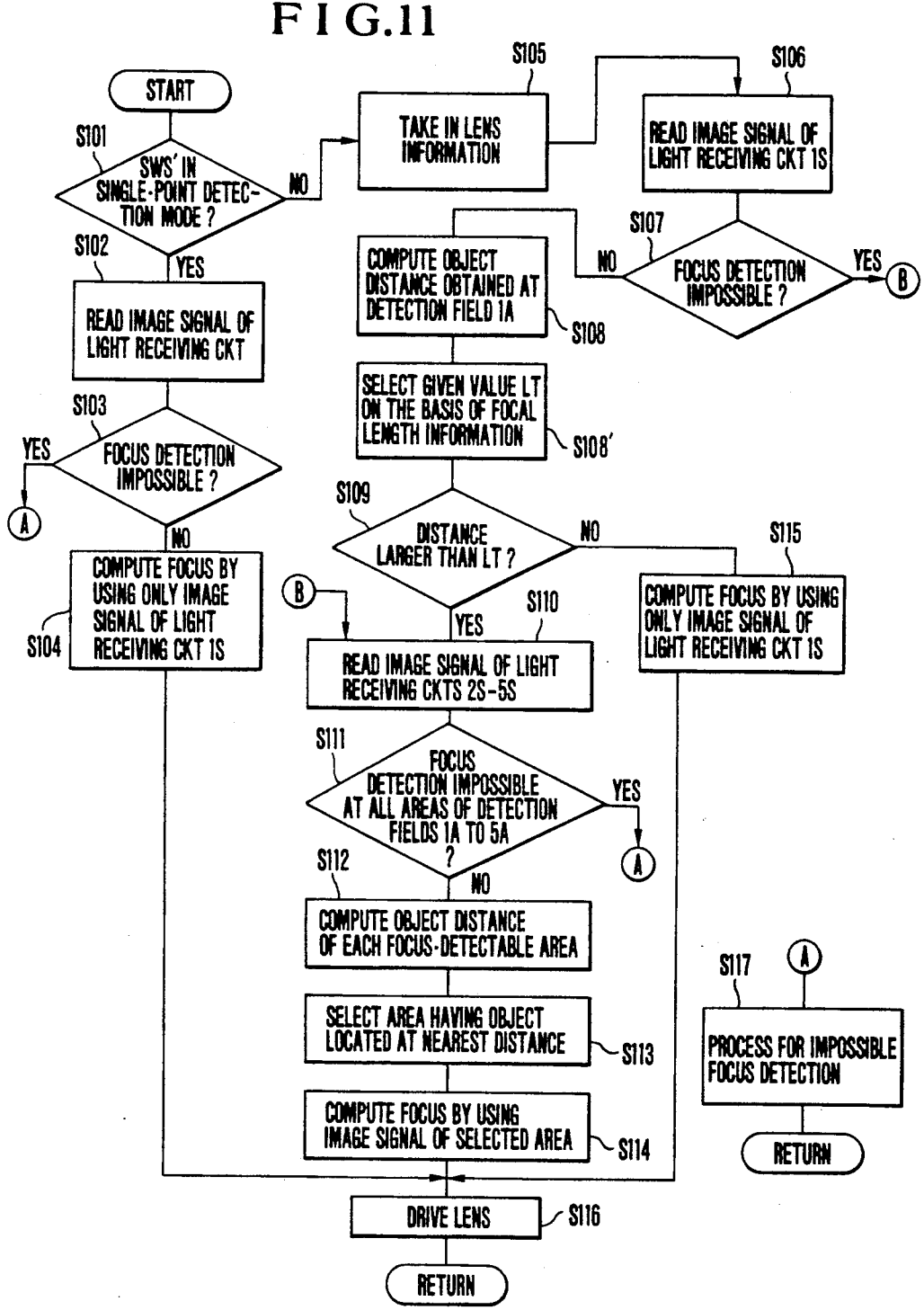
FIG. 11 is a flow chart showing the operation of the camera of FIG. 6.

The focus adjustment operation of the embodiment shown in FIG. 6 is described as follows with reference to FIG. 11 which is a flow chart: The component parts which are shown in FIG. 6 but do not directly participate in the focus adjustment are omitted from description. At a step S101: The photographer is expected to operate the switch SWS' for selection between a single-point detection mode in which the focus is detected only for the central part of the picture plane with the light receiving circuit 1S alone used and a multi-point detection mode in which the focus is detected for the whole picture plane with the use of the light receiving circuits 1S to 5S automatically changed from one over to another. The control circuit PRS then discriminates between the single-point detection mode and the multi-point detection mode. Step S102: When the control circuit PRS thus detects selection of the single-point detection mode, the image signal of the central part 1A of the picture plane is read out from the light receiving circuit 1S. Step S103: A check is made to see if the focus is detectable on the basis of the above-stated contrast of the image. Step S104: If the focus is detectable, the focus is computed by using solely the image signal of the light receiving circuit 1S. The flow comes to a step S116 to have the lens driven to its in-focus position. If the focus is found to be undetectable, the flow comes to a step S117 to perform some process such as making a warning display indicating that the focus is undetectable.

Meanwhile, when the multi-point detection mode is selected by the switch SWS', the flow comes to a step S105. Step S105: The control circuit PRS first obtains from the lens control circuit LNSU information on the focal length of the photo-taking lens and the position of the distance ring. Step S106: The control circuit PRS reads the image signal of the light receiving circuit 1S. Step S107: The contrast of the image signal is checked for detectability of the focus in the same manner as described above. If the focus is found to be detectable, the flow proceeds to a step S108. Step S108: A distance to the object obtained at the detection field 1A is computed on the basis of the defocus degree and information on the position of the distance ring of the lens. Step S109: A check is made to see if the measured distance of the above-stated detection field 1A is nearer than a given value LT which is selected by the control circuit PRS according to the above-stated information on the focal length of the photo-taking lens and will be described later (for a step S108'). If so, the flow comes to a step S115. Step S115: A focus computing operation is performed by using only the image signal for the detection field 1A. Step S116: The lens is driven to its in-focus position according to the result of the focus computation. Meanwhile, in a case where the focus is found to be undetectable at the step S107, or if the distance to the object measured at the detection field 1A is found to be farther than the given value LT at the step S109, the flow comes to a step S110. At the step S110: The control circuit PRS reads the image signals of the light receiving circuits 2S to 5S for the detection fields 2A to 5A which are located in the marginal areas of the picture plane.

Step S111: A discrimination is made between the possibility and the impossibility of focus detection from all the areas of the detection fields 1A to 5A by detecting the contrast of the image. If the focus is determined to be undetectable from all the areas, the flow comes to the step S117 to perform a process for the impossibility of focus detection, such as a warning display, etc. If the focus is found to be detectable from any one of the areas of the detection fields 1A to 5A, the flow proceeds to a step S112. Step S112: Distances to objects as obtained from the focus detectable areas are computed. Step S113: One of the focus detectable areas having the nearest distance is selected. Step S114: Focus adjustment computation is performed from the image signal of the area selected. Step S116: The lens is driven to an in-focus position computed.

Figure 12:
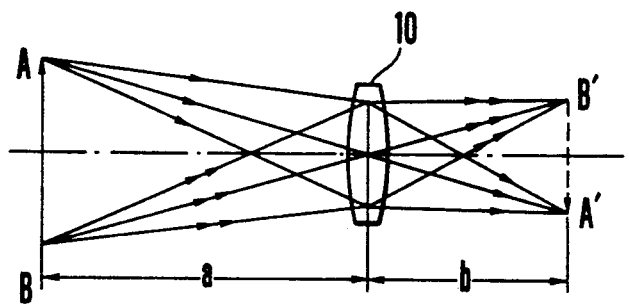
FIG. 12 shows an image formed on a film surface in relation to the object to be photographed.

Referring to FIG. 12, the above-stated given value LT is determined in the following manner: FIG. 12 shows a relation of an object to be photographed to its image formed on a film surface. A line segment A-B represents the size of the object. The size of the image of the object formed on the film surface by the phototaking lens 10 is as represented by a line segment A'-B'. Assuming that the distance from the photo-taking lens 10 to the object is "a" and the focal length of the lens is "f", the size of the image on the film surface $\overline{A'B'}$ can be expressed as follows:

$$\overline{A'B'} = \frac{f}{a - f} \cdot \overline{AB}$$

In the case of ordinary photographing where a background object is included in a picture along with a main object with the photo-taking lens 10 focused on the main object, the size of the main object never becomes excessively small on the film surface. Therefore, assuming that the lower limit size of the main object is "g"; the main object is a person with a size somewhat determined to have an upper limit size "h"; and a limit distance to the main object is the above-stated given value LT, the distance "a" to the main object seldom becomes too far. Hence, it can be expressed as follows:

$$a = \left(\frac{AB}{AB} + 1\right)f < \left(\frac{h}{g} + 1\right)f = LT$$

Therefore, the distance to the main object is nearer in general than the given value LT which is determined by the focal length of the lens. In the multi-point detection mode of the embodiment, the focus adjusting operation is arranged to be performed in the following manner: First, with photographing assumed to be performed in a normal manner, a distance measuring action is performed for an area located approximately at the center of the picture plane. If the measured distance to an object located within this area is farther than the given value LT determined by the control circuit PRS on the basis of the focal length of the photo-taking lens, the object is considered to be not a main object to be photographed. Then, the main object is considered to be very likely located in some area other than the central area. In this instance, therefore, a distance measuring action is performed for areas of the marginal parts of the picture plane. The lens is focused on one of the marginal areas giving the nearest measured distance, because: A main object is generally located at the nearest distance in front of a background. This arrangement, therefore, enables the lens to be focused on the main object almost in every case.

Figure 13:
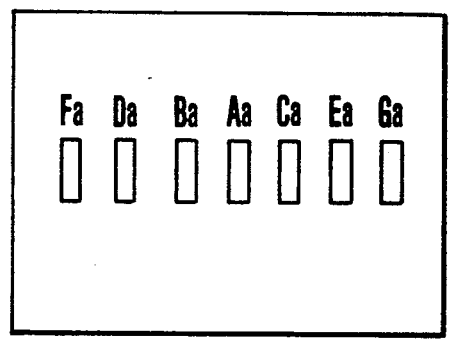
FIG. 13 shows the allocation of focus detection fields arranged within a picture plane as a modification of the camera of FIG. 6.
Figure 14:
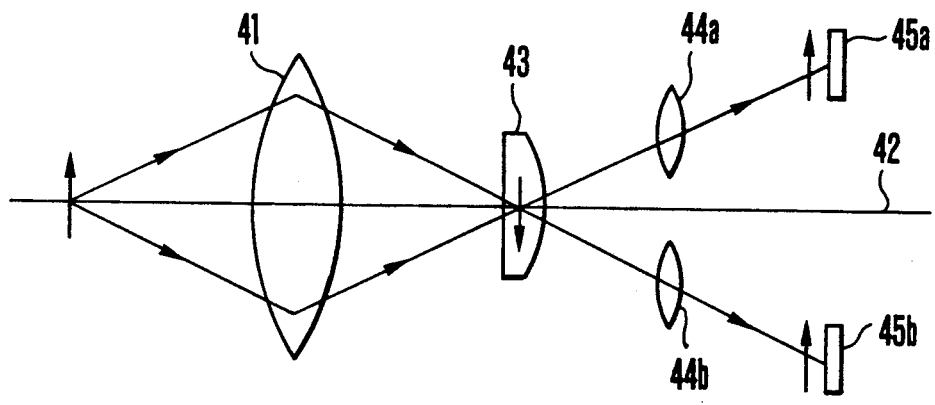
FIGS. 14, 15(A), 15(B) and 15(C) show the principle of focus detection.
Figure 15A:
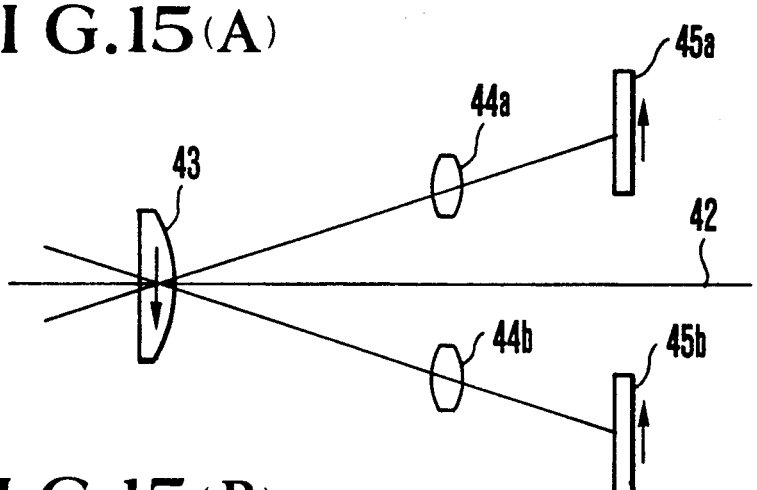
Figure 15B:
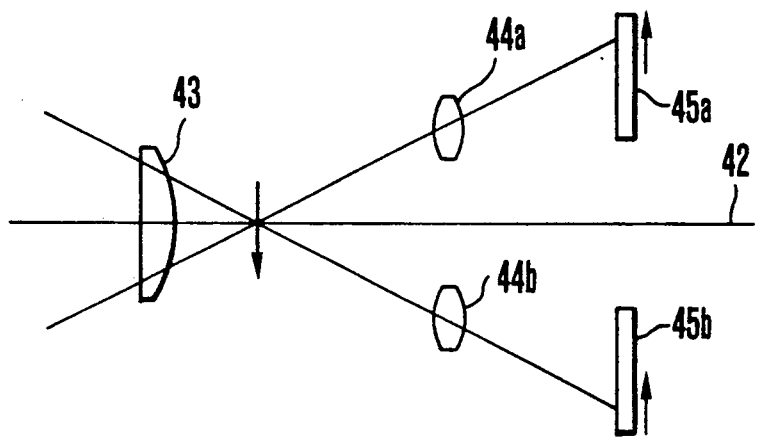
Figure 15C:
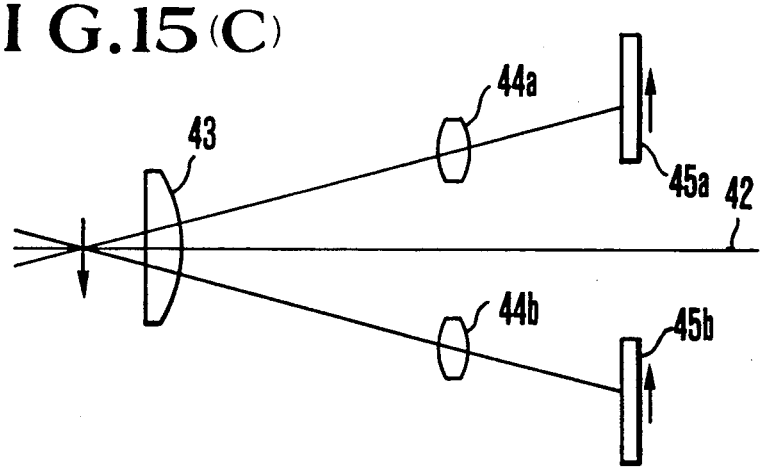

A total of five focus detection fields are provided in the case of this embodiment including one located in about the central part of the picture plane and four others in the marginal parts of the picture plane. However, the number of focus detection fields is not limited to five but can be changed to any number desired. Further, the focus detection fields may be arranged as shown in FIG. 13. In the case of FIG. 13, a number of focus detection fields Aa to Ga are aligned to extend from the central part of the picture plane toward the marginal parts thereof. The algorithm of the focus detecting operation of this modification is as follows: The distance measuring action is performed beginning with a central area Aa of the picture plane. If a measured distance to an object thus obtained is less than the given value LT, the focus adjusting computation is performed by using an image signal for this area. If not, distance measurement is performed for a next adjacent area Ba or Ca. If the distance value obtained from the area Ba or Ca is less than the given value LT, the focus adjusting computation is performed with the image signal of the area. If not, distance measurement is performed for a further adjacent area Da or Ea. The distance measuring process is thus performed on these areas of the focus detection fields one after another in this manner until an object located at a distance nearer than the given value LT is found. In a case where no object is found to be located at a distance nearer than the given value LT from all the focus detection fields, the focus adjusting computation may be performed by using the image signal of the focus detection field which has an object at the nearest distance among other focus detection fields. Further, in a case where the object's distance value obtained from the central focus detection field is larger than the given value LT and image signals of marginal focus detection fields are read along with that of the central detection field, not only the focus adjusting computation is performed with the image signal of the detection field having the nearest object among the focus detection fields, but the focus computing operation may be performed in the following manner: The depth of field is obtained from information on the aperture of the camera and the focus is adjusted in such a way as to have the nearest object within the depth of field thus obtained. It is also possible to ignore information on the image of an object located too near and to perform the focus adjusting computation with an image signal of an object located in some other zone.

The embodiment described is arranged to perform focus detection only for the central part of the picture plane when the measured distance value obtained by the central part is nearer than a given distance value. This arrangement may be changed to take the marginal parts of the picture plane also into consideration in such a way as to allow the central part to have priority over the marginal parts of the picture plane, unlike in the above-stated case where the measured distance obtained by the central part is farther than the given value.

Further, each of the embodiment described is arranged to use the secondary image forming method for focus detection. However, this arrangement may be changed to use an active method which is used for a lens-shutter type camera, etc. The active method enables the device to more simply obtain information on distances to objects so that the invention can be easily embodied.

Each of the embodiments described is arranged to have the focus detection fields clearly divided from each other. That arrangement, however, may be changed to use a long line sensor; to obtain an image signal from the central part of the long line sensor for the central area of the image plane; and to obtain image signals from the two end parts of the line sensor for the marginal areas of the picture plane.

Further, while this invention is applied to a camera in the case of each of the embodiments described, the invention is applicable also to other optical systems such as a telescope, a microscope, etc.

What is claimed is:

1. A focus adjustment device for measuring distances from a detector to a plurality of points on an image plane specified by an optical means to obtain distance measurement results, and for adjusting focus of said optical means on the basis of the distance measurement results, comprising:
   a) selecting means for selecting information on a distance measurement result indicative of the smallest distance measurement results obtained at said plurality of points; and
   b) restricting means for restricting said selecting means from selecting information according to a degree of nearness of said distance measurement result indicative of said nearest point in consideration of a focal length of said optical means, and a position of one of said plurality of points on said image plane at which said distance measurement result indicative of said nearest point is obtained.

2. A focus adjustment information forming device in which a plurality of points on a picture plane defined by optical means on which the focus adjustment is to be performed are subject to a distance measurement to measure the distance from a detector, and information of the focus adjustment of said optical means is formed on the basis of results of the plurality of distance measurements, comprising:
   (A) focal length signal input means for inputting a focal length signal corresponding to the focal length of said optical means; and
   (B) focus adjustment information forming means for forming the focus adjustment information by treating the plurality of distance measurements according to a predetermined algorithm, said focus adjustment information forming means taking into consideration the focal length in the course of the treatment according to the predetermined algorithm.

3. A device according to claim 2, wherein said focus adjustment information forming means includes judgement means for judging whether or not a shortest distance of the plurality of distance measurements is shorter than a predetermined value.

4. A device according to claim 3, wherein said focus adjustment information forming means includes restriction means for restricting use of the shortest distance measurement result as the focus adjustment information in said focus adjustment information forming means when the shortest distance of the plural distance measurement results in shorter than the predetermined value.

5. A device according to claim 4, wherein said focus adjustment information forming means includes means for liberating the use of the shortest distance measurement result from the restriction means if the shortest distance measuring result is obtained from a central portion of the picture plane even when the shortest distance is shorter than the predetermined value.

6. A device according to claim 4, wherein said focus adjustment information forming means includes excluding means for excluding the use of the shortest distance measurement result from the formation of the focus adjustment information when the shortest distance of the plural distance measurement results in shorter than the predetermined value.

7. A device according to claim 6, wherein aid focus adjustment information forming means includes means for liberating the use of the shortest distance measurement result from said excluding means if the shortest distance measurement result is obtained from a central portion of the picture plane.

8. A device according to claim 3, wherein said focus adjustment information forming means includes means for varying the predetermined value in accordance with the focal length signal.

9. A device according to claim 8, wherein said varying means includes means for shifting the predetermined value toward a long distance value as the focal length signal becomes a long focal length signal.

10. A device according to claim 4, wherein said focus adjustment information forming means includes means for varying the predetermined value in accordance with the focal length signal.

11. A device according to claim 10, wherein said varying means includes means for shifting the predetermined value toward a long distance value as the focal length signal becomes a long focal length signal.

12. A device according to claim 5, wherein said focus adjustment information forming means includes means for varying the predetermined value in accordance with the focal length signal.

13. A device according to claim 12, wherein said varying means includes means for shifting the predetermined value toward a long distance value as the focal length signal becomes a long focal length signal.

14. A device according to claim 6, wherein said focus adjustment information forming means includes means for varying the predetermined value in accordance with the focal length signal.

15. A device according to claim 14, wherein said varying means includes means for shifting the predetermined value toward a long distance value as the focal length signal becomes a long focal length signal.

16. A device according to claim 7, wherein said focus adjustment information forming means includes means for varying the predetermined value in accordance with the focal length signal.

17. A device according to claim 16, wherein said varying means includes means for shifting the predetermined value toward a long distance value as the focal length signal becomes a long focal length signal.

18. A device according to claim 2, further comprising distance measuring means for measuring distances to the plurality of points on the picture plane.

19. A device according to claim 18, wherein said distance measuring means includes means for performing each distance measurement on the basis of an amount of defocus of an image.

20. A device according to claim 2, further comprising means for performing the focus adjustment of said optical means in response to an output of said focus adjustment information forming means.

21. A device according to claim 2, wherein said focus adjustment information forming means includes judging means for judging whether or not a distance measurement of a central portion of the picture plane is larger than a predetermined value.

22. A device according to claim 21, wherein said focus adjustment information forming means includes means for forming the focus adjustment information by preferentially using the shortest distance among the plurality of distance measurement results when the distance measurement result of the central portion of said picture plane is larger than said predetermined value.

23. A device according to claim 22, wherein said focus adjustment information forming means includes means for varying the predetermined value in accordance with the focal length signal.

24. A device according to claim 23, wherein said varying means includes means for shifting the predetermined value toward a long distance value as the focal length signal becomes a long focal length signal.

25. A device according to claim 21, wherein said focus adjustment information forming means includes means for forming the focus adjustment information by selecting the shortest distance among the plurality of distance measurement results when the distance measurement result of the central portion of the picture plane is larger than the predetermined value.

26. A device according to claim 24, wherein said focus adjustment information forming means includes means for varying the predetermined value in accordance with the focal length signal.

27. A device according to claim 26, wherein said varying means includes means for shifting the predetermined value toward a long distance value as the focal length signal becomes a long focal length signal.

28. A device according to claim 21, wherein said focus adjustment information forming means includes means for forming the focus adjustment information by preferentially using the distance measurement of the central portion of said picture plane when the distance measurement result of the central portion of the picture plane is not larger than the predetermined value.

29. A device according to claim 28, wherein said focus adjustment information forming means includes means for varying the predetermined value in accordance with the focal length signal.

30. A device according to claim 29, wherein said varying means includes means for shifting the predetermined value toward a long distance value as the focal length signal becomes a long focal length signal.

31. A device according to claim 21, wherein said focus adjustment information forming means includes means for forming the focus adjustment information by selecting the distance measurement result of the central portion of the picture plane when said distance measurement result of the central portion of the picture plane is not larger than the predetermined value.

32. A device according to claim 31, wherein said focus adjustment information forming means includes means for varying the predetermined value in accordance with the focal length signal.

33. A device according to claim 32, wherein said varying means includes means for shifting the predetermined value toward a long distance value as the focal length signal becomes a long focal length signal.

34. A device according to claim 21, wherein said focus adjustment information forming means includes means for varying the predetermined value in accordance with the focal length signal.

35. A device according to claim 34, wherein said varying means includes means for shifting the predetermined value toward a long distance value as the focal length signal becomes a long focal length signal.

36. A device according to claim 3, wherein said focus adjustment information forming means includes variable means for varying the predetermined value in accordance with the measured point to be judged by said judgment means.

37. A device according to claim 36, wherein said variable means includes means for changing the predetermined value to a shorter distance value when the measured point to be judged by said judgment means lies in a central portion of the picture plane than when the measured point to be judged lies in a marginal portion of the picture plane.

38. A device according to claim 3, wherein said focus adjustment information forming means includes variable means for varying the predetermined value to a shorter distance value when the optical means comprises a macro-lens.

39. A device according to claim 3, wherein said focus adjustment information forming means includes means for preferring a distance measurement result which is the second shortest distance measurement result for use in the formation of the focus adjustment information when the shortest distance measurement result is smaller than the predetermined value.

40. A device according to claim 2, wherein said focus adjustment information forming means includes means for reviewing a relationship between the measured points of the picture plane and their corresponding distance measurement results for forming the focus adjustment information.

41. A device according to claim 2, wherein said focus adjustment information forming means includes means for preferring the distance measurement result of a central portion of the picture plane for the formation of the focus adjustment information when the distance measurement results of the picture plane from a marginal portion of the picture plane to an opposite marginal portion shifts from a short distance to a long distance.

42. A device according to claim 2, wherein said focus adjustment information means includes means for judging whether or not it is possible to form the focus adjustment information on the basis of the plural distance measurement results.

43. A camera in which plural points on a picture plane are distance-measured and information regarding focus adjustment of photographic optical means is formed on the basis of a plurality of distance measurements, comprising:
(A) focal length signal input means for inputting a focal length signal of the photographic optical means; and
(B) focus adjustment information forming means for forming the focus adjustment information by treating the plurality of distance measurements according to a predetermined algorithm, said focus adjustment information forming means taking into consideration the focal length in the course of the treatment according to the predetermined algorithm.

44. A camera according to claim 43, wherein said focus adjustment information forming means includes judgment means for judging whether or not a shortest distance of the plural distance measurements is smaller than a predetermined value.

45. A camera according to claim 44, wherein said focus adjustment information forming means includes restriction means for restricting use of the shortest distance measurement result as the focus adjustment information in said focus adjustment information forming means when the shortest distance of the plural distance measurement results is smaller than the predetermined value.

46. A camera according to claim 45, wherein said focus adjustment information forming means includes means for liberating the use of the shortest distance measurement result from the restriction means if said shortest distance measurement result is obtained from a central portion of a field of object photography even when the shortest distance is smaller than the predetermined value.

47. A camera according to claim 46, wherein said focus adjustment information forming means includes means for varying the predetermined value in accordance with the focal length signal.

48. A camera according to claim 47, wherein said varying means includes means for shifting the predetermined value toward a long distance value as the focal length signal becomes a long focal length signal.

49. A camera according to claim 45, wherein said focus adjustment information forming means includes means for varying the predetermined value in accordance with the focal length signal.

50. A camera according to claim 49, wherein said varying means includes means for shifting the predetermined value toward a long distance value as the length signal becomes a long focal length signal.

51. A camera according to claim 45, wherein said focus adjustment information forming means includes excluding means for excluding the use of the shortest distance measurement result from the formation of the focus adjustment information when the shortest distance of the plural distance measurement results is shorter than the predetermined value.

52. A camera according to claim 51, wherein said focus adjustment information forming means includes means for liberating the use of the shortest distance measurement result from the excluding means if the shortest distance measurement result is obtained from a central portion of the field of object photography.

53. A camera according to claim 52, wherein said focus adjustment information forming means includes means for varying the predetermined value in accordance with the focal length signal.

54. A camera according to claim 53, wherein the varying means includes means for shifting the predetermined value toward a long distance value as the focal length signal becomes a long focal length signal.

55. A camera according to claim 51, wherein said focus adjustment information forming means includes means for varying the predetermined value in accordance with the focal length signal.

56. A camera according to claim 55, wherein said varying means includes means for shifting the predetermined value toward a long distance value as the focal length signal becomes a long focal length signal.

57. A camera according to claim 44, wherein said focus adjustment information forming means includes means for varying the predetermined value in accordance with the focal length signal.

58. A camera according to claim 57, wherein said varying means includes means for shifting the predetermined value toward a long distance value as the focal length signal becomes a long focal length signal.

59. A camera according to claim 44, wherein the focus adjustment information forming means includes variable means for varying said predetermined value in accordance with the distance measurement point to be judged by said judgment means.

60. A camera according to claim 59, wherein said variable means includes means for changing the predetermined value to a shorter distance value when the distance measurement point to be judged by said judgment means lies in a central portion of the field of object photography than when the distance measurement point to be judged lies in a marginal portion of the field of object photography.

61. A camera according to claim 44, wherein said focus adjustment information forming means includes variable means for varying the predetermined value to a shorter distance value when the photographic optical means comprises a macro-lens.

62. A camera according to claim 44, wherein said focus adjustment information forming means includes means for preferring a distance measurement result which is the second shortest distance measurement result for use in the formation of the focus adjustment information when the shortest distance measurement result is smaller than the predetermined value.

63. A camera according to claim 43, wherein said focus adjustment information forming means includes means for reviewing a relationship between the distance measurement points of a field of object photography and their corresponding distance measurement results for forming the focus adjustment information.

64. A camera according to claim 43, wherein said focus adjustment information forming means includes means for preferring the distance measurement result of a central portion of a field of object photography for the formation of the focus adjustment information when the distance measurement results of the field of object photography from a marginal portion of the field of object photography to an opposite marginal portion shifts from a short distance to a long distance.

65. A camera according to claim 43, wherein said focus adjustment information forming means includes means for judging whether or not it is possible to form the focus adjustment information on the basis of the plural distance measurement results.

66. A camera according to claim 43, further comprising distance measuring means for measuring distances to a plurality of points in a field of object photography.

67. A camera according to claim 66, wherein said distance measuring means includes means for performing each distance measurement on the basis of an amount of defocus of an image.

68. A camera according to claim 43, further comprising means for performing focus adjustment of the photographic optical means in response to an output of said focus adjustment information forming means.

69. A camera according to claim 43, wherein said focus adjustment information forming means includes judgment means for judging whether or not a distance measurement of a central portion of a field of object photography is larger than a predetermined value.

70. A camera according to claim 69, wherein said focus adjustment information forming means includes means for forming the focus adjustment information by preferentially using the shortest distance among the plurality of distance measurement results when the distance measurement result of the central portion of the field of object photography is longer than said predetermined value.

71. A camera according to claim 70, wherein said focus adjustment information forming means includes means for varying the predetermined value in accordance with the focal length signal.

72. A camera according to claim 71, wherein said varying means includes means for shifting the predetermined value toward a long distance value as the focal length signal becomes a long focal length signal.

73. A camera according to claim 69, wherein said focus adjustment information forming means includes means for forming the focus adjustment information by selecting the shortest distance among the plurality of distance measurement results when the distance measurement result of the central portion of the field of object photography is longer than the predetermined value.

74. A camera according to claim 73, wherein said focus adjustment information forming means includes means for varying the predetermined value in accordance with the focal length signal.

75. A camera according to claim 74, wherein said varying means includes means for shifting the predetermined value toward a long distance value as the focal length signal becomes a long focal length signal.

76. A camera according to claim 69, wherein said focus adjustment information forming means includes means for forming the focus adjustment information by preferentially using the distance measurement of the central portion of the field of object photography when the distance measurement result of the central portion of the field of object photography is not longer than the predetermined value.

77. A camera according to claim 76, wherein said focus adjustment information forming means includes means for varying the predetermined value in accordance with the focal length signal.

78. A camera according to claim 77, wherein said varying means includes means for shifting the predetermined value toward a long distance value as the focal length signal becomes a long focal length signal.

79. A camera according to claim 69, wherein said focus adjustment information forming means includes means for forming the focus adjustment information by selecting the distance measurement result of the central portion of the field of object photography when the distance measurement result of the central portion of the field of object photography is not longer than the predetermined value.

80. A camera according to claim 79, wherein said focus adjustment information forming means includes means for varying the predetermined value in accordance with the focal length signal.

81. A camera according to claim 80, wherein said varying means includes means for shifting the predetermined value toward a long distance value as the focal length signal becomes a long focal length signal.

82. A camera according to claim 69, wherein said focus adjustment information forming means includes means for varying the predetermined value in accordance with the focal length signal.

83. A device according to claim 82, wherein said varying means includes means for shifting the predetermined value toward a long distance value as the focal length signal becomes a long focal length signal.

84. A focus adjustment information forming device in which light from objects positioned corresponding to a plurality of points on a picture plane defined by optical means on which the focus adjustment is performed are received to form focus adjustment information of the optical means on the basis of results of the reception of light corresponding to the plurality of points on the picture plane, comprising:
 (A) focal length signal input means for inputting a signal corresponding to the focal length of said optical means; and
 (B) focus adjustment information forming means for forming the focus adjustment information by treating the results of the light receiving according to a predetermined algorithm, said focus adjustment information forming means taking into consideration the focal length in the course of the treatment according to the predetermined algorithm.

85. A device according to claim 84, further comprising defocus state detecting means for obtaining a defocus state relative to the plurality of points on the picture plane.

86. A device according to claim 85, wherein said focus adjustment information forming means includes means for preferring a defocus state of a shortest distance among plural defocus states for forming the focus adjustment information.

87. A device according to claim 85, wherein said focus adjustment information forming means includes means for taking into consideration relations between the plurality of points on the picture plane and their respective defocus states for forming the focus adjustment information.

88. A device according to claim 85, wherein said focus adjustment information forming means includes means for preferring a defocus state of a central point on the picture plane for forming the focus adjustment information when the defocus states show the distance which is measured from the plurality of points to be increasing from a marginal portion on one side of the picture plane to a marginal portion on the other side of the picture plane.

89. A device according to claim 85, wherein said focus adjustment information forming means includes means for judging whether or not it is possible to form the focus adjustment information on the basis of the plural defocus states.

90. A device according to claim 84, further comprising means for performing the focus adjustment of said optical means in response to an output of said focus adjustment information forming means.

91. A device according to claim 84, wherein said focus adjustment information forming means includes means for taking into consideration positions of points on the picture plane on which the results of light receiving are sought for formation of the focus adjustment information.

92. A focus adjustment information forming device in which light from objects positioned in plural directions are received to form focus adjustment information for optical means on the basis of results of receiving the light from the plurality directions, comprising:
   (A) focal length signal input means for inputting a signal corresponding to the focal length of said optical means; and
   (B) focus adjustment information forming means for forming the focus adjustment information by treating the results of the light receiving according to a predetermined algorithm, said focus adjustment information forming means taking into consideration the focal length in the course of the treatment according to the predetermined algorithm.

93. A device according to claim 92, further comprising defocus state detecting means for obtaining a defocus state relative to the plurality of plural directions.

94. A device according to claim 93, wherein said focus adjustment information forming means includes means for preferring a defocus state of a shortest distance among plural defocus states for forming the focus adjustment information.

95. A device according to claim 93, wherein said focus adjustment information forming means includes means for taking into consideration relations between plural directions and their respective defocus states for forming the focus adjustment information.

96. A device according to claim 93, wherein said focus adjustment information forming means includes means for preferring a defocus state relative to a central direction on the picture plane for forming the focus adjustment information when the defocus states show the distance which is measured from the plurality of points to be increasing from a marginal portion on one side of the picture plane to a marginal portion on the other side of the picture plane.

97. A device according to claim 93, wherein said focus adjustment information forming means includes means for judging whether or not it is possible to form the focus adjustment information on the basis of said plural defocus states.

98. A device according to claim 92, further comprising means for performing the focus adjustment of said optical means in response to an output of said focus adjustment information forming means.

99. A device according to claim 92, wherein said focus adjustment information forming means includes means for taking into consideration positions of plural directions on which the results of light receiving are sought for formation of the focus adjustment information.

* * * * *

UNITED STATES PATENT AND TRADEMARK OFFICE
CERTIFICATE OF CORRECTION

PATENT NO. : 5,151,583
DATED : September 29, 1992
INVENTOR(S) : TOKUNAGA ET AL.

It is certified that error appears in the above-indentified patent and that said Letters Patent is hereby corrected as shown below:

TITLE PAGE, ITEM [63]

"Ser. No. 453,048" should be --Ser. No. 453,084--.

COLUMN 2

Line 22, "photo electric" should read --photo-electric--.

COLUMN 3

Line 16, "plied. FIG. 2" should read --plied. ¶ FIG. 2--.

COLUMN 7

Line 22, "further," should read --farther,--.

COLUMN 12

Line 6, "$\overline{AB}\atop AB$" should read --$\overline{\overline{AB}}\atop \overline{AB}$--.

Line 67, "margihal" should read --marginal--.

COLUMN 13

Line 23, "embodiment" should read --embodiments--.

UNITED STATES PATENT AND TRADEMARK OFFICE
CERTIFICATE OF CORRECTION

PATENT NO. : 5,151,583
DATED : September 29, 1992
INVENTOR(S) : TOKUNAGA ET AL.

It is certified that error appears in the above-identified patent and that said Letters Patent is hereby corrected as shown below:

COLUMN 14

Line 41, "aid" should read --said--.

COLUMN 15

Line 57, Claim 24," should read --claim 25,--.

COLUMN 16

Line 16, "said" should read --the--.

COLUMN 17

Line 6, "information meant" should read --information forming means--.

Line 62, "length" should read --focal length--.

Signed and Sealed this

Fourteenth Day of December, 1993

Attest:

BRUCE LEHMAN

Attesting Officer

Commissioner of Patents and Trademarks